(12) United States Patent
Smith et al.

(10) Patent No.: US 8,631,193 B2
(45) Date of Patent: Jan. 14, 2014

(54) EMULATION OF ABSTRACTED DIMMS USING ABSTRACTED DRAMS

(75) Inventors: Michael John Sebastian Smith, Palo Alto, CA (US); Suresh Natarajan Rajan, San Jose, CA (US); David T Wang, Thousand Oaks, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/473,827

(22) Filed: May 17, 2012

(65) Prior Publication Data
US 2012/0233395 A1    Sep. 13, 2012

Related U.S. Application Data

(62) Division of application No. 12/378,328, filed on Feb. 14, 2009.

(60) Provisional application No. 61/030,534, filed on Feb. 21, 2008.

(51) Int. Cl.
*G06F 12/00*    (2006.01)

(52) U.S. Cl.
USPC ........... 711/105; 711/5; 711/167; 365/189.12

(58) Field of Classification Search
USPC .............................. 711/5, 105, 167; 365/189.2
See application file for complete search history.

(56) References Cited

U.S. PATENT DOCUMENTS

| | | | |
|---|---|---|---|
| 3,800,292 A | 3/1974 | Curley et al. | |
| 4,069,452 A | 1/1978 | Conway et al. | |
| 4,323,965 A | 4/1982 | Johnson et al. | |
| 4,334,307 A | 6/1982 | Bourgeois et al. | |
| 4,345,319 A | 8/1982 | Bernardini et al. | |
| 4,392,212 A | 7/1983 | Miyasaka et al. | |
| 4,500,958 A | 2/1985 | Manton et al. | |

(Continued)

FOREIGN PATENT DOCUMENTS

| DE | 102004051345 A1 | 5/2006 |
|---|---|---|
| DE | 102004053316 A1 | 5/2006 |

(Continued)

OTHER PUBLICATIONS

Non-Final Office Action from U.S. Appl. No. 13/411,489, Dated Oct. 17, 2012.

(Continued)

*Primary Examiner* — Gurtej Bansal
(74) *Attorney, Agent, or Firm* — Fish & Richardson P.C.

(57) ABSTRACT

One embodiment of the present invention sets forth an abstracted memory subsystem comprising abstracted memories, which each may be configured to present memory related characteristics onto a memory system interface. The characteristics can be presented on the memory system interface via logic signals or protocol exchanges, and the characteristics may include any one or more of, an address space, a protocol, a memory type, a power management rule, a number of pipeline stages, a number of banks, a mapping to physical banks, a number of ranks, a timing characteristic, an address decoding option, a bus turnaround time parameter, an additional signal assertion, a sub-rank, a number of planes, or other memory-related characteristics. Some embodiments include an intelligent register device and/or, an intelligent buffer device. One advantage of the disclosed subsystem is that memory performance may be optimized regardless of the specific protocols used by the underlying memory hardware devices.

20 Claims, 15 Drawing Sheets

(56) References Cited

U.S. PATENT DOCUMENTS

| | | |
|---|---|---|
| 4,525,921 A | 7/1985 | Carson et al. |
| 4,566,082 A | 1/1986 | Anderson |
| 4,592,019 A | 5/1986 | Huang et al. |
| 4,628,407 A | 12/1986 | August et al. |
| 4,646,128 A | 2/1987 | Carson et al. |
| 4,698,748 A | 10/1987 | Juzswik et al. |
| 4,706,166 A | 11/1987 | Go |
| 4,710,903 A | 12/1987 | Hereth et al. |
| 4,764,846 A | 8/1988 | Go |
| 4,780,843 A | 10/1988 | Tietjen |
| 4,794,597 A | 12/1988 | Ooba et al. |
| 4,796,232 A | 1/1989 | House |
| 4,807,191 A | 2/1989 | Flannagan |
| 4,841,440 A | 6/1989 | Yonezu et al. |
| 4,862,347 A | 8/1989 | Rudy |
| 4,884,237 A | 11/1989 | Mueller et al. |
| 4,887,240 A | 12/1989 | Garverick et al. |
| 4,888,687 A | 12/1989 | Allison et al. |
| 4,899,107 A | 2/1990 | Corbett et al. |
| 4,912,678 A | 3/1990 | Mashiko |
| 4,916,575 A | 4/1990 | Van Asten |
| 4,922,451 A | 5/1990 | Lo et al. |
| 4,935,734 A | 6/1990 | Austin |
| 4,937,791 A | 6/1990 | Steele et al. |
| 4,956,694 A | 9/1990 | Eide |
| 4,982,265 A | 1/1991 | Watanabe et al. |
| 4,983,533 A | 1/1991 | Go |
| 5,025,364 A | 6/1991 | Zellmer |
| 5,072,424 A | 12/1991 | Brent et al. |
| 5,083,266 A | 1/1992 | Watanabe |
| 5,104,820 A | 4/1992 | Go et al. |
| 5,193,072 A | 3/1993 | Frenkil et al. |
| 5,212,666 A | 5/1993 | Takeda |
| 5,220,672 A | 6/1993 | Nakao et al. |
| 5,222,014 A | 6/1993 | Lin |
| 5,241,266 A | 8/1993 | Ahmad et al. |
| 5,252,807 A | 10/1993 | Chizinsky |
| 5,257,233 A | 10/1993 | Schaefer |
| 5,278,796 A | 1/1994 | Tillinghast et al. |
| 5,282,177 A | 1/1994 | McLaury |
| 5,332,922 A | 7/1994 | Oguchi et al. |
| 5,347,428 A | 9/1994 | Carson et al. |
| 5,369,749 A | 11/1994 | Baker et al. |
| 5,384,745 A | 1/1995 | Konishi et al. |
| 5,388,265 A | 2/1995 | Volk |
| 5,390,078 A | 2/1995 | Taylor |
| 5,390,334 A | 2/1995 | Harrison |
| 5,392,251 A | 2/1995 | Manning |
| 5,408,190 A | 4/1995 | Wood et al. |
| 5,432,729 A | 7/1995 | Carson et al. |
| 5,448,511 A | 9/1995 | Paurus et al. |
| 5,467,455 A | 11/1995 | Gay et al. |
| 5,483,497 A | 1/1996 | Mochizuki et al. |
| 5,498,886 A | 3/1996 | Hsu et al. |
| 5,502,333 A | 3/1996 | Bertin et al. |
| 5,502,667 A | 3/1996 | Bertin et al. |
| 5,513,135 A | 4/1996 | Dell et al. |
| 5,513,339 A | 4/1996 | Agrawal et al. |
| 5,519,832 A | 5/1996 | Warchol |
| 5,526,320 A | 6/1996 | Zagar et al. |
| 5,530,836 A | 6/1996 | Busch et al. |
| 5,550,781 A | 8/1996 | Sugawara et al. |
| 5,559,990 A | 9/1996 | Cheng et al. |
| 5,561,622 A | 10/1996 | Bertin et al. |
| 5,563,086 A | 10/1996 | Bertin et al. |
| 5,566,344 A | 10/1996 | Hail et al. |
| 5,581,498 A | 12/1996 | Ludwig et al. |
| 5,581,779 A | 12/1996 | Hall et al. |
| 5,590,071 A | 12/1996 | Kolor et al. |
| 5,598,376 A | 1/1997 | Merritt et al. |
| 5,604,714 A | 2/1997 | Manning et al. |
| 5,606,710 A | 2/1997 | Hall et al. |
| 5,608,262 A | 3/1997 | Degani et al. |
| 5,610,864 A | 3/1997 | Manning |
| 5,623,686 A | 4/1997 | Hall et al. |
| 5,627,791 A | 5/1997 | Wright et al. |
| 5,640,337 A | 6/1997 | Huang et al. |
| 5,640,364 A | 6/1997 | Merritt et al. |
| 5,652,724 A | 7/1997 | Manning |
| 5,654,204 A | 8/1997 | Anderson |
| 5,661,677 A | 8/1997 | Rondeau et al. |
| 5,661,695 A | 8/1997 | Zagar et al. |
| 5,668,773 A | 9/1997 | Zagar et al. |
| 5,675,549 A | 10/1997 | Ong et al. |
| 5,680,342 A | 10/1997 | Frankeny |
| 5,682,354 A | 10/1997 | Manning |
| 5,692,121 A | 11/1997 | Bozso et al. |
| 5,692,202 A | 11/1997 | Kardach et al. |
| 5,696,732 A | 12/1997 | Zagar et al. |
| 5,696,929 A | 12/1997 | Hasbun et al. |
| 5,702,984 A | 12/1997 | Bertin et al. |
| 5,703,813 A | 12/1997 | Manning et al. |
| 5,706,247 A | 1/1998 | Merritt et al. |
| RE35,733 E | 2/1998 | Hernandez et al. |
| 5,717,654 A | 2/1998 | Manning |
| 5,721,859 A | 2/1998 | Manning |
| 5,724,288 A | 3/1998 | Cloud et al. |
| 5,729,503 A | 3/1998 | Manning |
| 5,729,504 A | 3/1998 | Cowles |
| 5,742,792 A | 4/1998 | Yanai et al. |
| 5,748,914 A | 5/1998 | Barth et al. |
| 5,752,045 A | 5/1998 | Chen |
| 5,757,703 A | 5/1998 | Merritt et al. |
| 5,760,478 A | 6/1998 | Bozso et al. |
| 5,761,703 A | 6/1998 | Bolyn |
| 5,781,766 A | 7/1998 | Davis |
| 5,787,457 A | 7/1998 | Miller et al. |
| 5,798,961 A | 8/1998 | Heyden et al. |
| 5,802,010 A | 9/1998 | Zagar et al. |
| 5,802,395 A | 9/1998 | Connolly et al. |
| 5,802,555 A | 9/1998 | Shlgeeda |
| 5,812,488 A | 9/1998 | Zagar et al. |
| 5,818,788 A | 10/1998 | Kimura et al. |
| 5,819,065 A | 10/1998 | Chilton et al. |
| 5,831,833 A | 11/1998 | Shirakawa et al. |
| 5,831,931 A | 11/1998 | Manning |
| 5,831,932 A | 11/1998 | Merritt et al. |
| 5,834,838 A | 11/1998 | Anderson |
| 5,835,435 A | 11/1998 | Bogin et al. |
| 5,838,165 A | 11/1998 | Chatter |
| 5,838,177 A | 11/1998 | Kee |
| 5,841,580 A | 11/1998 | Farmwald et al. |
| 5,843,799 A | 12/1998 | Hsu et al. |
| 5,843,807 A | 12/1998 | Burns |
| 5,845,108 A | 12/1998 | Yoo et al. |
| 5,850,368 A | 12/1998 | Ong et al. |
| 5,859,792 A | 1/1999 | Rondeau et al. |
| 5,860,106 A | 1/1999 | Domen et al. |
| 5,870,347 A | 2/1999 | Keeth et al. |
| 5,870,350 A | 2/1999 | Bertin |
| 5,872,907 A | 2/1999 | Griess et al. |
| 5,875,142 A | 2/1999 | Chevallier |
| 5,878,279 A | 3/1999 | Athenes |
| 5,884,088 A | 3/1999 | Kardach et al. |
| 5,901,105 A | 5/1999 | Ong et al. |
| 5,903,500 A | 5/1999 | Tsang et al. |
| 5,905,688 A | 5/1999 | Park |
| 5,907,512 A | 5/1999 | Parkinson et al. |
| 5,910,010 A | 6/1999 | Nishizawa et al. |
| 5,915,105 A | 6/1999 | Farmwald et al. |
| 5,915,167 A | 6/1999 | Leedy |
| 5,917,758 A | 6/1999 | Keeth |
| 5,923,611 A | 7/1999 | Ryan |
| 5,924,111 A | 7/1999 | Huang et al. |
| 5,926,435 A | 7/1999 | Park et al. |
| 5,929,650 A | 7/1999 | Pappert et al. |
| 5,943,254 A | 8/1999 | Bakeman, Jr. et al. |
| 5,946,265 A | 8/1999 | Cowles |
| 5,949,254 A | 9/1999 | Keeth |
| 5,953,215 A | 9/1999 | Karabatsos |
| 5,953,263 A | 9/1999 | Farmwald et al. |
| 5,954,804 A | 9/1999 | Farmwald et al. |
| 5,956,233 A | 9/1999 | Yew et al. |
| 5,963,429 A | 10/1999 | Chen |

(56) References Cited

U.S. PATENT DOCUMENTS

| | | |
|---|---|---|
| 5,963,463 A | 10/1999 | Rondeau et al. |
| 5,963,464 A | 10/1999 | Dell et al. |
| 5,963,504 A | 10/1999 | Manning |
| 5,966,724 A | 10/1999 | Ryan |
| 5,966,727 A | 10/1999 | Nishino |
| 5,969,996 A | 10/1999 | Muranaka et al. |
| 5,973,392 A | 10/1999 | Senba et al. |
| 5,978,304 A | 11/1999 | Crafts |
| 5,995,424 A | 11/1999 | Lawrence et al. |
| 5,995,443 A | 11/1999 | Farrnwald et al. |
| 6,001,671 A | 12/1999 | Fjelstad |
| 6,002,613 A | 12/1999 | Cloud et al. |
| 6,002,627 A | 12/1999 | Chevallier |
| 6,014,339 A | 1/2000 | Kobayashi et al. |
| 6,016,282 A | 1/2000 | Keeth |
| 6,026,027 A | 2/2000 | Terrell, II et al. |
| 6,026,050 A | 2/2000 | Baker et al. |
| 6,029,250 A | 2/2000 | Keeth |
| 6,032,214 A | 2/2000 | Farrnwald et al. |
| 6,032,215 A | 2/2000 | Farmwald et al. |
| 6,034,916 A | 3/2000 | Lee |
| 6,034,918 A | 3/2000 | Farrnwald et al. |
| 6,035,365 A | 3/2000 | Farrnwald et al. |
| 6,038,195 A | 3/2000 | Farrnwald et al. |
| 6,038,673 A | 3/2000 | Benn et al. |
| 6,044,032 A | 3/2000 | Li |
| 6,047,073 A | 4/2000 | Norris et al. |
| 6,047,344 A | 4/2000 | Kawasumi et al. |
| 6,047,361 A | 4/2000 | Ingenio et al. |
| 6,053,948 A | 4/2000 | Vaidyanathan et al. |
| 6,058,451 A | 5/2000 | Bermingham et al. |
| 6,065,092 A | 5/2000 | Roy |
| 6,069,504 A | 5/2000 | Keeth |
| 6,070,217 A | 5/2000 | Connolly et al. |
| 6,073,223 A | 6/2000 | McAllister et al. |
| 6,075,730 A | 6/2000 | Barth et al. |
| 6,075,744 A | 6/2000 | Tsem et al. |
| 6,078,546 A | 6/2000 | Lee |
| 6,079,025 A | 6/2000 | Fung |
| 6,084,434 A | 7/2000 | Keeth |
| 6,088,290 A | 7/2000 | Ohtake et al. |
| 6,091,251 A | 7/2000 | Wood et al. |
| RE36,839 E | 8/2000 | Simmons et al. |
| 6,101,152 A | 8/2000 | Farmwald et al. |
| 6,101,564 A | 8/2000 | Athenes et al. |
| 6,101,612 A | 8/2000 | Jeddeloh |
| 6,108,795 A | 8/2000 | Jeddeloh |
| 6,111,812 A | 8/2000 | Gans et al. |
| 6,134,638 A | 10/2000 | Olang et al. |
| 6,154,370 A | 11/2000 | Degani et al. |
| 6,166,991 A | 12/2000 | Phelan |
| 6,181,640 B1 | 1/2001 | Kang |
| 6,182,184 B1 | 1/2001 | Fannwald et al. |
| 6,199,151 B1 | 3/2001 | Williams et al. |
| 6,208,168 B1 | 3/2001 | Rhee |
| 6,216,246 B1 | 4/2001 | Shau |
| 6,222,739 B1 | 4/2001 | Bhakta et al. |
| 6,226,709 B1 | 5/2001 | Goodwin et al. |
| 6,226,730 B1 | 5/2001 | Murdoch et al. |
| 6,233,192 B1 | 5/2001 | Tanaka |
| 6,233,650 B1 | 5/2001 | Johnson et al. |
| 6,240,048 B1 | 5/2001 | Matsubara |
| 6,243,282 B1 | 6/2001 | Rondeau et al. |
| 6,252,807 B1 | 6/2001 | Suzuki et al. |
| 6,253,278 B1 | 6/2001 | Ryan |
| 6,260,097 B1 | 7/2001 | Farmwald et al. |
| 6,260,154 B1 | 7/2001 | Jeddeloh |
| 6,262,938 B1 | 7/2001 | Lee et al. |
| 6,266,285 B1 | 7/2001 | Fannwald et al. |
| 6,266,292 B1 | 7/2001 | Tsem et al. |
| 6,274,395 B1 | 8/2001 | Weber |
| 6,279,069 B1 | 8/2001 | Robinson et al. |
| 6,295,572 B1 | 9/2001 | Wu |
| 6,297,966 B1 | 10/2001 | Lee et al. |
| 6,298,426 B1 | 10/2001 | Ajanovic |
| 6,304,511 B1 | 10/2001 | Gens et al. |
| 6,307,769 B1 | 10/2001 | Nuxoll et al. |
| 6,314,051 B1 | 11/2001 | Farmwald et al. |
| 6,317,352 B1 | 11/2001 | Halbert et al. |
| 6,317,381 B1 | 11/2001 | Gans et al. |
| 6,324,120 B2 | 11/2001 | Fannwald et al. |
| 6,326,810 B1 | 12/2001 | Keeth |
| 6,327,664 B1 | 12/2001 | Dell et al. |
| 6,330,683 B1 | 12/2001 | Jeddeloh |
| 6,336,174 B1 | 1/2002 | Li et al. |
| 6,338,108 B1 | 1/2002 | Motomura |
| 6,338,113 B1 | 1/2002 | Kubo et al. |
| 6,341,347 B1 | 1/2002 | Joy et al. |
| 6,343,019 B1 | 1/2002 | Jiang et al. |
| 6,343,042 B1 | 1/2002 | Tsern et al. |
| 6,353,561 B1 | 3/2002 | Funvu et al. |
| 6,356,105 B1 | 3/2002 | Yolk |
| 6,356,500 B1 | 3/2002 | Cloud et al. |
| 6,362,656 B2 | 3/2002 | Rhee |
| 6,363,031 B2 | 3/2002 | Phelan |
| 6,378,020 B2 | 4/2002 | Farmwald et al. |
| 6,381,188 B1 | 4/2002 | Choi et al. |
| 6,381,668 B1 | 4/2002 | Lunteren |
| 6,389,514 B1 | 5/2002 | Rokicki |
| 6,392,304 B1 | 5/2002 | Butler |
| 6,414,868 B1 | 7/2002 | Wong et al. |
| 6,418,034 B1 | 7/2002 | Weber et al. |
| 6,421,754 B1 | 7/2002 | Kau et al. |
| 6,424,532 B2 | 7/2002 | Kawamura |
| 6,426,916 B2 | 7/2002 | Fannwald et al. |
| 6,429,029 B1 | 8/2002 | Eldridge et al. |
| 6,430,103 B2 | 8/2002 | Nakayama et al. |
| 6,434,660 B1 | 8/2002 | Lambert et al. |
| 6,437,600 B1 | 8/2002 | Keeth |
| 6,438,057 B1 | 8/2002 | Ruckerbauer |
| 6,442,698 B2 | 8/2002 | Nizar |
| 6,445,591 B1 | 9/2002 | Kwong |
| 6,452,826 B1 | 9/2002 | Kim et al. |
| 6,452,863 B2 | 9/2002 | Farmwald et al. |
| 6,453,400 B1 | 9/2002 | Maesako et al. |
| 6,453,402 B1 | 9/2002 | Jeddeloh |
| 6,453,434 B2 | 9/2002 | Delp et al. |
| 6,455,348 B1 | 9/2002 | Yamaguchi |
| 6,457,095 B1 | 9/2002 | Yolk |
| 6,459,651 B1 | 10/2002 | Lee et al. |
| 6,473,831 B1 | 10/2002 | Schade |
| 6,476,476 B1 | 11/2002 | Glenn |
| 6,480,929 B1 | 11/2002 | Gauthier et al. |
| 6,487,102 B1 | 11/2002 | Halbert et al. |
| 6,489,669 B2 | 12/2002 | Shimada et al. |
| 6,490,161 B1 | 12/2002 | Johnson |
| 6,492,726 B1 | 12/2002 | Quek et al. |
| 6,493,789 B2 | 12/2002 | Ware et al. |
| 6,496,440 B2 | 12/2002 | Manning |
| 6,496,897 B2 | 12/2002 | Ware et al. |
| 6,498,766 B2 | 12/2002 | Lee et al. |
| 6,510,097 B2 | 1/2003 | Fukuyama |
| 6,510,503 B2 | 1/2003 | Gillingham et al. |
| 6,512,392 B2 | 1/2003 | Fleury et al. |
| 6,521,984 B2 | 2/2003 | Matsuura |
| 6,526,471 B1 | 2/2003 | Shimomura et al. |
| 6,526,473 B1 | 2/2003 | Kim |
| 6,526,484 B1 | 2/2003 | Stacovsky et al. |
| 6,545,895 B1 | 4/2003 | Li et al. |
| 6,546,446 B2 | 4/2003 | Farmwald et al. |
| 6,553,450 B1 | 4/2003 | Dodd et al. |
| 6,560,158 B2 | 5/2003 | 'Choi et al. |
| 6,563,337 B2 | 5/2003 | Dour |
| 6,563,759 B2 | 5/2003 | Yahata et al. |
| 6,564,281 B2 | 5/2003 | Farmwald et al. |
| 6,564,285 B1 | 5/2003 | Mills et al. |
| 6,574,150 B2 | 6/2003 | Suyama et al. |
| 6,584,037 B2 | 6/2003 | Farmwald et al. |
| 6,587,912 B2 | 7/2003 | Leddige et al. |
| 6,590,822 B2 | 7/2003 | Hwang et al. |
| 6,594,770 B1 | 7/2003 | Sato et al. |
| 6,597,616 B2 | 7/2003 | Tsem et al. |
| 6,597,617 B2 | 7/2003 | Ooishi et al. |
| 6,614,700 B2 | 9/2003 | Dietrich et al. |

(56) References Cited

U.S. PATENT DOCUMENTS

| | | |
|---|---|---|
| 6,618,267 B1 | 9/2003 | Dalal et al. |
| 6,618,791 B1 | 9/2003 | Dodd et al. |
| 6,621,760 B1 | 9/2003 | Ahmad et al. |
| 6,628,538 B2 | 9/2003 | Funaba et al. |
| 6,630,729 B2 | 10/2003 | Huang |
| 6,631,086 B1 | 10/2003 | Bill et al. |
| 6,639,820 B1 | 10/2003 | Khandekar et al. |
| 6,646,939 B2 | 11/2003 | Kwak |
| 6,650,588 B2 | 11/2003 | Yamagata |
| 6,650,594 B1 | 11/2003 | Lee et al. |
| 6,657,634 B1 | 12/2003 | Sinclair et al. |
| 6,657,918 B2 | 12/2003 | Foss et al. |
| 6,657,919 B2 | 12/2003 | Foss et al. |
| 6,658,016 B1 | 12/2003 | Dai et al. |
| 6,658,530 B1 | 12/2003 | Robertson et al. |
| 6,659,512 B1 | 12/2003 | Harper et al. |
| 6,664,625 B2 | 12/2003 | Hiruma |
| 6,665,224 B1 | 12/2003 | Lehmann et al. |
| 6,665,227 B2 | 12/2003 | Fetzer |
| 6,668,242 B1 | 12/2003 | Reynov et al. |
| 6,674,154 B2 | 1/2004 | Minamio et al. |
| 6,683,372 B1 | 1/2004 | Wong et al. |
| 6,684,292 B2 | 1/2004 | Piccirillo et al. |
| 6,690,191 B2 | 2/2004 | Wu et al. |
| 6,697,295 B2 | 2/2004 | Fannwald et al. |
| 6,701,446 B2 | 3/2004 | Tsern et al. |
| 6,705,877 B1 | 3/2004 | Li et al. |
| 6,708,144 B1 | 3/2004 | Merryman et al. |
| 6,710,430 B2 | 3/2004 | Minamio et al. |
| 6,711,043 B2 | 3/2004 | Friedman et al. |
| 6,713,856 B2 | 3/2004 | Tsai et al. |
| 6,714,433 B2 | 3/2004 | Doblar et al. |
| 6,714,891 B2 | 3/2004 | Dendinger et al. |
| 6,724,684 B2 | 4/2004 | Kim |
| 6,730,540 B2 | 5/2004 | Siniaguine |
| 6,731,009 B1 | 5/2004 | Jones et al. |
| 6,731,527 B2 | 5/2004 | Brown |
| 6,742,098 B1 | 5/2004 | Halbert et al. |
| 6,744,687 B2 | 6/2004 | Koo et al. |
| 6,747,887 B2 | 6/2004 | Halbert et al. |
| 6,751,113 B2 | 6/2004 | Bhakta et al. |
| 6,751,696 B2 | 6/2004 | Fannwald et al. |
| 6,754,129 B2 | 6/2004 | Khatri et al. |
| 6,754,132 B2 | 6/2004 | Kyung |
| 6,757,751 B1 | 6/2004 | Gene |
| 6,762,948 B2 | 7/2004 | Kyun et al. |
| 6,765,812 B2 | 7/2004 | Anderson |
| 6,766,469 B2 | 7/2004 | Larson et al. |
| 6,771,526 B2 | 8/2004 | LaBerge |
| 6,772,359 B2 | 8/2004 | Kwak et al. |
| 6,779,097 B2 | 8/2004 | Gillingham et al. |
| 6,785,767 B2 | 8/2004 | Coulson |
| 6,791,877 B2 | 9/2004 | Miura et al. |
| 6,795,899 B2 | 9/2004 | Dodd et al. |
| 6,799,241 B2 | 9/2004 | Kahn et al. |
| 6,801,989 B2 | 10/2004 | Johnson et al. |
| 6,807,598 B2 | 10/2004 | Fannwald et al. |
| 6,807,650 B2 | 10/2004 | Lamb et al. |
| 6,807,655 B2 | 10/2004 | Rehani et al. |
| 6,810,475 B1 | 10/2004 | Tardieux |
| 6,816,991 B2 | 11/2004 | Sangllani |
| 6,819,602 B2 | 11/2004 | Seo et al. |
| 6,819,617 B2 | 11/2004 | Hwang et al. |
| 6,820,163 B1 | 11/2004 | McCall et al. |
| 6,820,169 B2 | 11/2004 | Wilcox et al. |
| 6,826,104 B2 | 11/2004 | Kawaguchi et al. |
| 6,839,290 B2 | 1/2005 | Ahmad et al. |
| 6,845,027 B2 | 1/2005 | Mayer et al. |
| 6,845,055 B1 | 1/2005 | Koga et al. |
| 6,847,582 B2 | 1/2005 | Pan |
| 6,850,449 B2 | 2/2005 | Takahashi |
| 6,854,043 B2 | 2/2005 | Hargis et al. |
| 6,862,202 B2 | 3/2005 | Schaefer |
| 6,862,249 B2 | 3/2005 | Kyung |
| 6,862,653 B1 | 3/2005 | Dodd et al. |
| 6,873,534 B2 | 3/2005 | Bhakta et al. |
| 6,878,570 B2 | 4/2005 | Lyu et al. |
| 6,894,933 B2 | 5/2005 | Kuzmenka et al. |
| 6,898,683 B2 | 5/2005 | Nakamura |
| 6,908,314 B2 | 6/2005 | Brown |
| 6,912,778 B2 | 7/2005 | Ahn et al. |
| 6,914,786 B1 | 7/2005 | Paulsen et al. |
| 6,917,219 B2 | 7/2005 | New |
| 6,922,371 B2 | 7/2005 | Takahashi et al. |
| 6,930,900 B2 | 8/2005 | Bhakta et al. |
| 6,930,903 B2 | 8/2005 | Bhakta et al. |
| 6,938,119 B2 | 8/2005 | Kohn et al. |
| 6,943,450 B2 | 9/2005 | Fee et al. |
| 6,944,748 B2 | 9/2005 | Sanches et al. |
| 6,947,341 B2 | 9/2005 | Stubbs et al. |
| 6,951,982 B2 | 10/2005 | Chye et al. |
| 6,952,794 B2 | 10/2005 | Lu |
| 6,961,281 B2 | 11/2005 | Wong et al. |
| 6,968,416 B2 | 11/2005 | Moy |
| 6,968,419 B1 | 11/2005 | Holman |
| 6,970,968 B1 | 11/2005 | Holman |
| 6,980,021 B1 | 12/2005 | Srivastava et al. |
| 6,986,118 B2 | 1/2006 | Dickman |
| 6,992,501 B2 | 1/2006 | Rapport |
| 6,992,950 B2 | 1/2006 | Foss et al. |
| 7,000,062 B2 | 2/2006 | Perego et al. |
| 7,003,618 B2 | 2/2006 | Perego et al. |
| 7,003,639 B2 | 2/2006 | Tsern et al. |
| 7,007,095 B2 | 2/2006 | Chen et al. |
| 7,007,175 B2 | 2/2006 | Chang et al. |
| 7,010,642 B2 | 3/2006 | Perego et al. |
| 7,010,736 B1 | 3/2006 | Teh et al. |
| 7,024,518 B2 | 4/2006 | Halbert et al. |
| 7,026,708 B2 | 4/2006 | Cady et al. |
| 7,028,215 B2 | 4/2006 | Depew et al. |
| 7,028,234 B2 | 4/2006 | Huckaby et al. |
| 7,033,861 B1 | 4/2006 | Partridge et al. |
| 7,035,150 B2 | 4/2006 | Streif et al. |
| 7,043,599 B1 | 5/2006 | Ware et al. |
| 7,043,611 B2 | 5/2006 | McClannahan et al. |
| 7,045,396 B2 | 5/2006 | Crowley et al. |
| 7,045,901 B2 | 5/2006 | Lin et al. |
| 7,046,538 B2 | 5/2006 | Kinsley et al. |
| 7,053,470 B1 | 5/2006 | Sellers et al. |
| 7,053,478 B2 | 5/2006 | Roper et al. |
| 7,058,776 B2 | 6/2006 | Lee |
| 7,058,863 B2 | 6/2006 | Kouchi et al. |
| 7,061,784 B2 | 6/2006 | Jakobs et al. |
| 7,061,823 B2 | 6/2006 | Faue et al. |
| 7,066,741 B2 | 6/2006 | Burns et al. |
| 7,075,175 B2 | 7/2006 | Kazi et al. |
| 7,079,396 B2 | 7/2006 | Gates et al. |
| 7,079,441 B1 | 7/2006 | Partsch et al. |
| 7,079,446 B2 | 7/2006 | Murtagh et al. |
| 7,085,152 B2 | 8/2006 | Ellis et al. |
| 7,085,941 B2 | 8/2006 | Li |
| 7,089,438 B2 | 8/2006 | Raad |
| 7,093,101 B2 | 8/2006 | Aasheim et al. |
| 7,103,730 B2 | 9/2006 | Saxena et al. |
| 7,111,143 B2 | 9/2006 | Walker |
| 7,117,309 B2 | 10/2006 | Bearden |
| 7,119,428 B2 | 10/2006 | Tanie et al. |
| 7,120,727 B2 | 10/2006 | Lee et al. |
| 7,126,399 B1 | 10/2006 | Lee |
| 7,127,567 B2 | 10/2006 | Ramakrishnan et al. |
| 7,133,960 B1 | 11/2006 | Thompson et al. |
| 7,136,978 B2 | 11/2006 | Miura et al. |
| 7,138,823 B2 | 11/2006 | Janzen et al. |
| 7,149,145 B2 | 12/2006 | Kim et al. |
| 7,149,824 B2 | 12/2006 | Johnson |
| 7,173,863 B2 | 2/2007 | Conley et al. |
| 7,200,021 B2 | 4/2007 | Raghuram |
| 7,205,789 B1 | 4/2007 | Karabatsos |
| 7,210,059 B2 | 4/2007 | Jeddoloh |
| 7,215,561 B2 | 5/2007 | Park et al. |
| 7,218,566 B1 | 5/2007 | Totolos, Jr. et al. |
| 7,224,595 B2 | 5/2007 | Dreps et al. |
| 7,228,264 B2 | 6/2007 | Barrenscheen et al. |
| 7,231,562 B2 | 6/2007 | Ohlhoff et al. |

(56) References Cited

U.S. PATENT DOCUMENTS

| | | |
|---|---|---|
| 7,233,541 B2 | 6/2007 | Yamamoto et al. |
| 7,234,081 B2 | 6/2007 | Nguyen et al. |
| 7,243,185 B2 | 7/2007 | See et al. |
| 7,245,541 B2 | 7/2007 | Janzen |
| 7,254,036 B2 | 8/2007 | Pauley et al. |
| 7,266,639 B2 | 9/2007 | Raghuram |
| 7,269,042 B2 | 9/2007 | Kinsley et al. |
| 7,269,708 B2 | 9/2007 | Ware |
| 7,274,583 B2 | 9/2007 | Park et al. |
| 7,277,333 B2 | 10/2007 | Schaefer |
| 7,286,436 B2 | 10/2007 | Bhakta et al. |
| 7,289,386 B2 | 10/2007 | Bhakta et al. |
| 7,296,754 B2 | 11/2007 | Nishlzawa et al. |
| 7,299,330 B2 | 11/2007 | Gillingham et al. |
| 7,302,598 B2 | 11/2007 | Suzuki et al. |
| 7,307,863 B2 | 12/2007 | Yen et al. |
| 7,317,250 B2 | 1/2008 | Koh et al. |
| 7,327,613 B2 | 2/2008 | Lee |
| 7,336,490 B2 | 2/2008 | Harris et al. |
| 7,337,293 B2 | 2/2008 | Brittain et al. |
| 7,363,422 B2 | 4/2008 | Perego et al. |
| 7,366,947 B2 | 4/2008 | Gower et al. |
| 7,379,316 B2 | 5/2008 | Rajan |
| 7,386,656 B2 | 6/2008 | Rajan et al. |
| 7,392,338 B2 | 6/2008 | Rajan et al. |
| 7,408,393 B1 | 8/2008 | Jain et al. |
| 7,409,492 B2 | 8/2008 | Tanaka et al. |
| 7,414,917 B2 | 8/2008 | Ruckerbauer et al. |
| 7,428,644 B2 | 9/2008 | Jeddeloh et al. |
| 7,437,579 B2 | 10/2008 | Jeddeloh et al. |
| 7,441,064 B2 | 10/2008 | Gaskins |
| 7,457,122 B2 | 11/2008 | Lai et al. |
| 7,464,225 B2 | 12/2008 | Tsem |
| 7,472,220 B2 | 12/2008 | Rajan et al. |
| 7,474,576 B2 | 1/2009 | Co et al. |
| 7,480,147 B2 | 1/2009 | Hoss et al. |
| 7,480,774 B2 | 1/2009 | Ellis et al. |
| 7,496,777 B2 | 2/2009 | Kapil |
| 7,499,281 B2 | 3/2009 | Harris et al. |
| 7,515,453 B2 | 4/2009 | Rajan |
| 7,532,537 B2 | 5/2009 | Solomon et al. |
| 7,539,800 B2 | 5/2009 | Dell et al. |
| 7,573,136 B2 | 8/2009 | Jiang et al. |
| 7,580,312 B2 | 8/2009 | Rajan et al. |
| 7,581,121 B2 | 8/2009 | Barth et al. |
| 7,581,127 B2 | 8/2009 | Rajan et al. |
| 7,590,796 B2 | 9/2009 | Rajan et al. |
| 7,599,205 B2 | 10/2009 | Rajan |
| 7,606,245 B2 | 10/2009 | Ma et al. |
| 7,609,567 B2 | 10/2009 | Rajan et al. |
| 7,613,880 B2 | 11/2009 | Miura et al. |
| 7,619,912 B2 | 11/2009 | Bhakta et al. |
| 7,724,589 B2 | 5/2010 | Rajan et al. |
| 7,730,338 B2 | 6/2010 | Rajan et al. |
| 7,738,252 B2 | 6/2010 | Schuette et al. |
| 7,761,724 B2 | 7/2010 | Rajan et al. |
| 7,791,889 B2 | 9/2010 | Belady et al. |
| 7,911,798 B2 | 3/2011 | Chang et al. |
| 7,934,070 B2 | 4/2011 | Brittain et al. |
| 7,990,797 B2 | 8/2011 | Moshayedi et al. |
| 8,116,144 B2 | 2/2012 | Shaw et al. |
| 2001/0000822 A1 | 5/2001 | Dell et al. |
| 2001/0003198 A1 | 6/2001 | Wu |
| 2001/0011322 A1 | 8/2001 | Stolt et al. |
| 2001/0019509 A1 | 9/2001 | Aho et al. |
| 2001/0021106 A1 | 9/2001 | Weber et al. |
| 2001/0021137 A1 | 9/2001 | Kai et al. |
| 2001/0046129 A1 | 11/2001 | Broglia et al. |
| 2001/0046163 A1 | 11/2001 | Yanagawa |
| 2001/0052062 A1 | 12/2001 | Lipovski |
| 2002/0002662 A1 | 1/2002 | Olarig et al. |
| 2002/0004897 A1 | 1/2002 | Kao et al. |
| 2002/0015340 A1 | 2/2002 | Batinovich |
| 2002/0019961 A1 | 2/2002 | Blodgett |
| 2002/0034068 A1 | 3/2002 | Weber et al. |
| 2002/0038405 A1 | 3/2002 | Leddige et al. |
| 2002/0040416 A1 | 4/2002 | Tsern et al. |
| 2002/0041507 A1 | 4/2002 | Woo et al. |
| 2002/0051398 A1 | 5/2002 | Mizugaki |
| 2002/0060945 A1 | 5/2002 | Ikeda |
| 2002/0060948 A1 | 5/2002 | Chang et al. |
| 2002/0064073 A1 | 5/2002 | Chien |
| 2002/0064083 A1 | 5/2002 | Ryu et al. |
| 2002/0089831 A1 | 7/2002 | Forthun |
| 2002/0089970 A1 | 7/2002 | Asada et al. |
| 2002/0094671 A1 | 7/2002 | Distefano et al. |
| 2002/0121650 A1 | 9/2002 | Minamio et al. |
| 2002/0121670 A1 | 9/2002 | Minamio et al. |
| 2002/0124195 A1 | 9/2002 | Nizar |
| 2002/0129204 A1 | 9/2002 | Leighnor et al. |
| 2002/0145900 A1 | 10/2002 | Schaefer |
| 2002/0165706 A1 | 11/2002 | Raynham |
| 2002/0167092 A1 | 11/2002 | Fee et al. |
| 2002/0172024 A1 | 11/2002 | Hui et al. |
| 2002/0174274 A1 | 11/2002 | Wu et al. |
| 2002/0184438 A1 | 12/2002 | Usui |
| 2003/0002262 A1 | 1/2003 | Benisek et al. |
| 2003/0011993 A1 | 1/2003 | Summers et al. |
| 2003/0016550 A1 | 1/2003 | Yoo et al. |
| 2003/0021175 A1 | 1/2003 | TaeKwak |
| 2003/0026155 A1 | 2/2003 | Yamagata |
| 2003/0026159 A1 | 2/2003 | Frankowsky et al. |
| 2003/0035312 A1 | 2/2003 | Halbert et al. |
| 2003/0039158 A1 | 2/2003 | Horiguchi et al. |
| 2003/0041295 A1 | 2/2003 | Hou et al. |
| 2003/0061458 A1 | 3/2003 | Wilcox et al. |
| 2003/0061459 A1 | 3/2003 | Aboulenein et al. |
| 2003/0083855 A1 | 5/2003 | Fukuyama |
| 2003/0088743 A1 | 5/2003 | Rader |
| 2003/0093614 A1 | 5/2003 | Kohn et al. |
| 2003/0101392 A1 | 5/2003 | Lee |
| 2003/0105932 A1 | 6/2003 | David et al. |
| 2003/0110339 A1 | 6/2003 | Calvignac et al. |
| 2003/0117875 A1 | 6/2003 | Lee et al. |
| 2003/0123389 A1 | 7/2003 | Russell et al. |
| 2003/0126338 A1 | 7/2003 | Dodd et al. |
| 2003/0127737 A1 | 7/2003 | Takahashi |
| 2003/0131160 A1 | 7/2003 | Hampel et al. |
| 2003/0145163 A1 | 7/2003 | Seo et al. |
| 2003/0158995 A1 | 8/2003 | Lee et al. |
| 2003/0164539 A1 | 9/2003 | Yau |
| 2003/0164543 A1 | 9/2003 | Kheng Lee |
| 2003/0174569 A1 | 9/2003 | Amidi |
| 2003/0182513 A1 | 9/2003 | Dodd et al. |
| 2003/0183934 A1 | 10/2003 | Barrett |
| 2003/0189868 A1 | 10/2003 | Riesenman et al. |
| 2003/0189870 A1 | 10/2003 | Wilcox |
| 2003/0191888 A1 | 10/2003 | Klein |
| 2003/0191915 A1 | 10/2003 | Saxena et al. |
| 2003/0200382 A1 | 10/2003 | Wells et al. |
| 2003/0200474 A1 | 10/2003 | Li |
| 2003/0205802 A1 | 11/2003 | Segaram et al. |
| 2003/0206476 A1 | 11/2003 | Joo |
| 2003/0217303 A1 | 11/2003 | Chua-Eoan et al. |
| 2003/0223290 A1 | 12/2003 | Park et al. |
| 2003/0227798 A1 | 12/2003 | Pax |
| 2003/0229821 A1 | 12/2003 | Ma |
| 2003/0230801 A1 | 12/2003 | Jiang et al. |
| 2003/0231540 A1 | 12/2003 | Lazar et al. |
| 2003/0231542 A1 | 12/2003 | Zaharinova-Papazova et al. |
| 2003/0234664 A1 | 12/2003 | Yamagata |
| 2004/0016994 A1 | 1/2004 | Huang |
| 2004/0027902 A1 | 2/2004 | Ooishi et al. |
| 2004/0034732 A1 | 2/2004 | Valin et al. |
| 2004/0034755 A1 | 2/2004 | LaBerge et al. |
| 2004/0037133 A1 | 2/2004 | Park et al. |
| 2004/0042503 A1 | 3/2004 | Shaeffer et al. |
| 2004/0044808 A1 | 3/2004 | Salmon et al. |
| 2004/0047228 A1 | 3/2004 | Chen |
| 2004/0049624 A1 | 3/2004 | Salmonsen |
| 2004/0057317 A1 | 3/2004 | Schaefer |
| 2004/0064647 A1 | 4/2004 | DeWhitt et al. |
| 2004/0064767 A1 | 4/2004 | Huckaby et al. |
| 2004/0083324 A1 | 4/2004 | Rabinovitz et al. |

(56) References Cited

U.S. PATENT DOCUMENTS

| | | |
|---|---|---|
| 2004/0088475 A1 | 5/2004 | Streif et al. |
| 2004/0100837 A1 | 5/2004 | Lee |
| 2004/0117723 A1 | 6/2004 | Foss |
| 2004/0123173 A1 | 6/2004 | Emberling et al. |
| 2004/0125635 A1 | 7/2004 | Kuzmenka |
| 2004/0133736 A1 | 7/2004 | Kyung |
| 2004/0139359 A1 | 7/2004 | Samson et al. |
| 2004/0145963 A1 | 7/2004 | Byon |
| 2004/0151038 A1 | 8/2004 | Ruckerbauer et al. |
| 2004/0174765 A1 | 9/2004 | Seo et al. |
| 2004/0177079 A1 | 9/2004 | Gluhovsky et al. |
| 2004/0178824 A1 | 9/2004 | Pan |
| 2004/0184324 A1 | 9/2004 | Pax |
| 2004/0186956 A1 | 9/2004 | Perego et al. |
| 2004/0188704 A1 | 9/2004 | Halbert et al. |
| 2004/0196732 A1 | 10/2004 | Lee |
| 2004/0205433 A1 | 10/2004 | Gower et al. |
| 2004/0208173 A1 | 10/2004 | Di Gregorio |
| 2004/0225858 A1 | 11/2004 | Brueggen |
| 2004/0228166 A1 | 11/2004 | Braun et al. |
| 2004/0228196 A1 | 11/2004 | Kwak et al. |
| 2004/0228203 A1 | 11/2004 | Koo |
| 2004/0230932 A1 | 11/2004 | Dickmann |
| 2004/0236877 A1 | 11/2004 | Burton |
| 2004/0250989 A1 | 12/2004 | Im et al. |
| 2004/0256638 A1 | 12/2004 | Perego et al. |
| 2004/0257847 A1 | 12/2004 | Matsui et al. |
| 2004/0260957 A1 | 12/2004 | Leddeloh et al. |
| 2004/0264255 A1 | 12/2004 | Royer |
| 2004/0268161 A1 | 12/2004 | Ross |
| 2005/0018495 A1 | 1/2005 | Bhakta et al. |
| 2005/0021874 A1 | 1/2005 | Georgiou et al. |
| 2005/0024963 A1 | 2/2005 | Lakobs et al. |
| 2005/0027928 A1 | 2/2005 | Avraham et al. |
| 2005/0028038 A1 | 2/2005 | Pomaranski et al. |
| 2005/0034004 A1 | 2/2005 | Bunker et al. |
| 2005/0036350 A1 | 2/2005 | So et al. |
| 2005/0041504 A1 | 2/2005 | Perego et al. |
| 2005/0044302 A1* | 2/2005 | Pauley et al. ..................... 711/1 |
| 2005/0044303 A1 | 2/2005 | Perego et al. |
| 2005/0044305 A1 | 2/2005 | Lakobs et al. |
| 2005/0047192 A1 | 3/2005 | Matsui et al. |
| 2005/0071543 A1 | 3/2005 | Ellis et al. |
| 2005/0078532 A1 | 4/2005 | Ruckerbauer et al. |
| 2005/0081085 A1 | 4/2005 | Ellis et al. |
| 2005/0086548 A1 | 4/2005 | Haid et al. |
| 2005/0099834 A1 | 5/2005 | Funaba et al. |
| 2005/0102590 A1 | 5/2005 | Norris et al. |
| 2005/0105318 A1 | 5/2005 | Funaba et al. |
| 2005/0108460 A1 | 5/2005 | David |
| 2005/0127531 A1 | 6/2005 | Tay et al. |
| 2005/0132158 A1 | 6/2005 | Hampel et al. |
| 2005/0135176 A1 | 6/2005 | Ramakrishnan et al. |
| 2005/0138267 A1 | 6/2005 | Bains et al. |
| 2005/0138304 A1 | 6/2005 | Ramakrishnan et al. |
| 2005/0139977 A1 | 6/2005 | Nishio et al. |
| 2005/0141199 A1 | 6/2005 | Chiou et al. |
| 2005/0149662 A1 | 7/2005 | Perego |
| 2005/0152212 A1 | 7/2005 | Yang et al. |
| 2005/0156934 A1 | 7/2005 | Perego et al. |
| 2005/0166026 A1 | 7/2005 | Ware et al. |
| 2005/0193163 A1 | 9/2005 | Perego |
| 2005/0193183 A1 | 9/2005 | Barth et al. |
| 2005/0194676 A1 | 9/2005 | Fukuda et al. |
| 2005/0194991 A1 | 9/2005 | Dour et al. |
| 2005/0195629 A1 | 9/2005 | Leddige et al. |
| 2005/0201063 A1 | 9/2005 | Lee et al. |
| 2005/0204111 A1 | 9/2005 | Natarajan |
| 2005/0207255 A1 | 9/2005 | Perego et al. |
| 2005/0210196 A1 | 9/2005 | Perego et al. |
| 2005/0223179 A1 | 10/2005 | Perego et al. |
| 2005/0224948 A1 | 10/2005 | Lee et al. |
| 2005/0232049 A1 | 10/2005 | Park |
| 2005/0235119 A1 | 10/2005 | Sechrest et al. |
| 2005/0235131 A1 | 10/2005 | Ware |
| 2005/0237838 A1 | 10/2005 | Kwak et al. |
| 2005/0243635 A1 | 11/2005 | Schaefer |
| 2005/0246558 A1 | 11/2005 | Ku |
| 2005/0249011 A1 | 11/2005 | Maeda |
| 2005/0259504 A1 | 11/2005 | Murtugh et al. |
| 2005/0263312 A1 | 12/2005 | Bolken et al. |
| 2005/0265506 A1 | 12/2005 | Foss et al. |
| 2005/0269715 A1 | 12/2005 | Yoo |
| 2005/0278474 A1 | 12/2005 | Perersen et al. |
| 2005/0281096 A1 | 12/2005 | Bhakta et al. |
| 2005/0281123 A1 | 12/2005 | Bell et al. |
| 2005/0283572 A1 | 12/2005 | Ishihara |
| 2005/0285174 A1 | 12/2005 | Saito et al. |
| 2005/0286334 A1 | 12/2005 | Saito et al. |
| 2005/0289292 A1 | 12/2005 | Morrow et al. |
| 2005/0289317 A1 | 12/2005 | Liou et al. |
| 2006/0002201 A1 | 1/2006 | Janzen |
| 2006/0010339 A1 | 1/2006 | Klein |
| 2006/0026484 A1 | 2/2006 | Hollums |
| 2006/0038597 A1 | 2/2006 | Becker et al. |
| 2006/0039204 A1 | 2/2006 | Cornelius |
| 2006/0039205 A1* | 2/2006 | Cornelius ................. 365/189.05 |
| 2006/0041711 A1 | 2/2006 | Miura et al. |
| 2006/0041730 A1 | 2/2006 | Larson |
| 2006/0044909 A1 | 3/2006 | Kinsley et al. |
| 2006/0044913 A1 | 3/2006 | Klein et al. |
| 2006/0049502 A1 | 3/2006 | Goodwin et al. |
| 2006/0050574 A1 | 3/2006 | Streif et al. |
| 2006/0056244 A1 | 3/2006 | Ware |
| 2006/0062047 A1 | 3/2006 | Bhakta et al. |
| 2006/0067141 A1 | 3/2006 | Perego et al. |
| 2006/0085616 A1 | 4/2006 | Zeighami et al. |
| 2006/0087900 A1 | 4/2006 | Bucksch et al. |
| 2006/0090031 A1 | 4/2006 | Kirshenbaum et al. |
| 2006/0090054 A1 | 4/2006 | Choi et al. |
| 2006/0106951 A1 | 5/2006 | Bains |
| 2006/0112214 A1 | 5/2006 | Yeh |
| 2006/0112219 A1 | 5/2006 | Chawla et al. |
| 2006/0117152 A1 | 6/2006 | Amidi et al. |
| 2006/0117160 A1 | 6/2006 | Jackson et al. |
| 2006/0118933 A1 | 6/2006 | Haba |
| 2006/0120193 A1 | 6/2006 | Casper |
| 2006/0123265 A1 | 6/2006 | Ruckerbauer et al. |
| 2006/0126369 A1 | 6/2006 | Raghuram |
| 2006/0129712 A1 | 6/2006 | Raghuram |
| 2006/0129740 A1 | 6/2006 | Ruckerbauer et al. |
| 2006/0129755 A1 | 6/2006 | Raghuram |
| 2006/0133173 A1 | 6/2006 | Jain et al. |
| 2006/0136791 A1 | 6/2006 | Nierle |
| 2006/0149857 A1 | 7/2006 | Holman |
| 2006/0149982 A1 | 7/2006 | Vogt |
| 2006/0174082 A1 | 8/2006 | Bellows et al. |
| 2006/0176744 A1 | 8/2006 | Stave |
| 2006/0179262 A1 | 8/2006 | Brittain et al. |
| 2006/0179333 A1 | 8/2006 | Brittain et al. |
| 2006/0179334 A1 | 8/2006 | Brittain et al. |
| 2006/0180926 A1 | 8/2006 | Mullen et al. |
| 2006/0181953 A1 | 8/2006 | Rotenberg et al. |
| 2006/0195631 A1 | 8/2006 | Rajamani |
| 2006/0198178 A1 | 9/2006 | Kinsley et al. |
| 2006/0203590 A1 | 9/2006 | Mori et al. |
| 2006/0206738 A1 | 9/2006 | Leddeloh et al. |
| 2006/0233012 A1 | 10/2006 | Sekiguchi et al. |
| 2006/0236165 A1 | 10/2006 | Cepulis et al. |
| 2006/0236201 A1 | 10/2006 | Gower et al. |
| 2006/0248261 A1 | 11/2006 | Jacob et al. |
| 2006/0248387 A1 | 11/2006 | Nicholson et al. |
| 2006/0262586 A1 | 11/2006 | Solomon et al. |
| 2006/0262587 A1 | 11/2006 | Matsui et al. |
| 2006/0277355 A1 | 12/2006 | Ellsberry et al. |
| 2006/0294295 A1 | 12/2006 | Fukuzo |
| 2007/0005998 A1 | 1/2007 | Jain et al. |
| 2007/0050530 A1 | 3/2007 | Rajan |
| 2007/0058471 A1 | 3/2007 | Rajan et al. |
| 2007/0070669 A1 | 3/2007 | Tsern |
| 2007/0088995 A1 | 4/2007 | Tsern et al. |
| 2007/0091696 A1 | 4/2007 | Niggemeier et al. |
| 2007/0106860 A1 | 5/2007 | Foster, Sr. et al. |
| 2007/0136537 A1 | 6/2007 | Doblar et al. |

(56) References Cited

U.S. PATENT DOCUMENTS

| | | |
|---|---|---|
| 2007/0152313 A1 | 7/2007 | Periaman et al. |
| 2007/0162700 A1 | 7/2007 | Fortin et al. |
| 2007/0188997 A1 | 8/2007 | Hockanson et al. |
| 2007/0192563 A1 | 8/2007 | Rajan et al. |
| 2007/0195613 A1 | 8/2007 | Rajan et al. |
| 2007/0204075 A1 | 8/2007 | Rajan et al. |
| 2007/0216445 A1 | 9/2007 | Raghavan et al. |
| 2007/0247194 A1 | 10/2007 | Jain |
| 2007/0279084 A1 | 12/2007 | Oh et al. |
| 2007/0285895 A1 | 12/2007 | Gruendler et al. |
| 2007/0288683 A1 | 12/2007 | Panabaker et al. |
| 2007/0288686 A1 | 12/2007 | Arcedera et al. |
| 2007/0288687 A1 | 12/2007 | Panabaker et al. |
| 2008/0002447 A1 | 1/2008 | Gulachenski et al. |
| 2008/0010435 A1 | 1/2008 | Smith et al. |
| 2008/0025108 A1 | 1/2008 | Ralan et al. |
| 2008/0025122 A1 | 1/2008 | Shakel et al. |
| 2008/0025136 A1 | 1/2008 | Rajan et al. |
| 2008/0025137 A1 | 1/2008 | Rajan et al. |
| 2008/0027697 A1 | 1/2008 | Rajan et al. |
| 2008/0027702 A1 | 1/2008 | Rajan et al. |
| 2008/0027703 A1 | 1/2008 | Rajan et al. |
| 2008/0028135 A1 | 1/2008 | Rajan et al. |
| 2008/0028136 A1 | 1/2008 | Schakel et al. |
| 2008/0028137 A1 | 1/2008 | Schakel et al. |
| 2008/0115006 A1 | 1/2008 | Smith et al. |
| 2008/0031030 A1 | 2/2008 | Rajan et al. |
| 2008/0031072 A1 | 2/2008 | Rajan et al. |
| 2008/0034130 A1 | 2/2008 | Perego et al. |
| 2008/0037353 A1 | 2/2008 | Rajan et al. |
| 2008/0056014 A1 | 3/2008 | Rajan et al. |
| 2008/0062773 A1 | 3/2008 | Rajan et al. |
| 2008/0065820 A1 | 3/2008 | Gillingham et al. |
| 2008/0082763 A1 | 4/2008 | Rajan et al. |
| 2008/0086588 A1 | 4/2008 | Danilak et al. |
| 2008/0089034 A1 | 4/2008 | Hoss et al. |
| 2008/0098277 A1 | 4/2008 | Hazelzet |
| 2008/0103753 A1 | 5/2008 | Rajan et al. |
| 2008/0104314 A1 | 5/2008 | Rajan et al. |
| 2008/0109206 A1 | 5/2008 | Rajan et al. |
| 2008/0109595 A1 | 5/2008 | Rajan et al. |
| 2008/0109597 A1 | 5/2008 | Schakel et al. |
| 2008/0109598 A1 | 5/2008 | Schakel et al. |
| 2008/0120443 A1 | 5/2008 | Rajan et al. |
| 2008/0120458 A1 | 5/2008 | Gillingham et al. |
| 2008/0123459 A1 | 5/2008 | Rajan et al. |
| 2008/0126624 A1 | 5/2008 | Prete et al. |
| 2008/0126687 A1 | 5/2008 | Rajan et al. |
| 2008/0126688 A1 | 5/2008 | Rajan et al. |
| 2008/0126689 A1 | 5/2008 | Rajan et al. |
| 2008/0126690 A1 | 5/2008 | Rajan et al. |
| 2008/0126692 A1 | 5/2008 | Rajan et al. |
| 2008/0130364 A1 | 6/2008 | Guterman et al. |
| 2008/0133825 A1 | 6/2008 | Rajan et al. |
| 2008/0155136 A1 | 6/2008 | Hishino |
| 2008/0159027 A1 | 7/2008 | Kim |
| 2008/0170425 A1 | 7/2008 | Rajan |
| 2008/0195894 A1 | 8/2008 | Schreck et al. |
| 2008/0215832 A1 | 9/2008 | Allen et al. |
| 2008/0239857 A1 | 10/2008 | Rajan et al. |
| 2008/0239858 A1 | 10/2008 | Rajan et al. |
| 2008/0256282 A1 | 10/2008 | Guo et al. |
| 2008/0282084 A1 | 11/2008 | Hatakeyama |
| 2008/0282341 A1 | 11/2008 | Hatakeyama |
| 2009/0024789 A1 | 1/2009 | Rajan et al. |
| 2009/0024790 A1 | 1/2009 | Rajan et al. |
| 2009/0049266 A1 | 2/2009 | Kuhne |
| 2009/0063865 A1 | 3/2009 | Berenbaum et al. |
| 2009/0063896 A1 | 3/2009 | Lastras-Montano et al. |
| 2009/0070520 A1 | 3/2009 | Mizushima |
| 2009/0089480 A1 | 4/2009 | Wah et al. |
| 2009/0109613 A1 | 4/2009 | Legen et al. |
| 2009/0180926 A1 | 7/2009 | Petruno et al. |
| 2009/0216939 A1 | 8/2009 | Smith et al. |
| 2009/0285031 A1 | 11/2009 | Rajan et al. |
| 2009/0290442 A1 | 11/2009 | Rajan |
| 2010/0005218 A1 | 1/2010 | Gower et al. |
| 2010/0020585 A1 | 1/2010 | Rajan |
| 2010/0257304 A1 | 10/2010 | Rajan et al. |
| 2010/0271888 A1 | 10/2010 | Rajan |
| 2010/0281280 A1 | 11/2010 | Rajan et al. |

FOREIGN PATENT DOCUMENTS

| | | |
|---|---|---|
| DE | I02005036528 A1 | 2/2007 |
| EP | 0644547 | 3/1995 |
| JP | 62121978 A | 6/1987 |
| JP | 01-171047 | 7/1989 |
| JP | 03-29357 | 2/1991 |
| JP | 03-286234 | 12/1991 |
| JP | 03276487 B2 | 12/1991 |
| JP | 05-298192 | 11/1993 |
| JP | 07-141870 | 6/1995 |
| JP | 08-77097 | 3/1996 |
| JP | 11-149775 | 6/1999 |
| JP | 22025255 A2 | 1/2002 |
| JP | 3304893 B2 | 5/2002 |
| JP | 04-327474 | 11/2004 |
| JP | 2006236388 A | 9/2006 |
| KR | 1020040062717 | 7/2004 |
| KR | 2005120344 | 12/2005 |
| WO | WO95/05676 A1 | 2/1995 |
| WO | WO97/25674 | 7/1997 |
| WO | PCT/JP98/02866 | 1/1999 |
| WO | WO9900734 | 1/1999 |
| WO | WO00/45270 | 8/2000 |
| WO | WO01/90900 | 11/2001 |
| WO | WO01/97160 | 12/2001 |
| WO | WO2004/044754 | 5/2004 |
| WO | WO2004/051645 | 6/2004 |
| WO | WO2006/072040 | 7/2006 |
| WO | WO2007/028109 | 3/2007 |
| WO | WO2007/038225 A2 | 4/2007 |
| WO | WO2007/095080 | 8/2007 |
| WO | WO2007/002324 A2 | 11/2007 |
| WO | WO2008063251 | 5/2008 |

OTHER PUBLICATIONS

Non-Final Office Action from U.S. Appl. No. 13/471,283, Dated Dec. 7, 2012.

Office Action, including English translation, from co-pending Japanese application No. 2008-529353, Dated Dec. 27, 2012.

Office Action from co-pending European patent application No. EP12150798, Dated Jan. 3, 2013.

Office Action from co-pending Korean patent application No. KR1020087005172, dated Dec. 20, 2012.

AMD, BIOS and Kernel Developer's Guide (BKDG) Family 10h Processor, Sep. 7, 2007, published for processor family purchasers. Sep. 7, 2007.

Buffer Device for Memory Modules (DIMM), IP.com Prior Art Database, <URL: http://ip.com/IPCOM/000144850>, Feb. 10, 2007, 1 pg.

Final Office Action from U.S. Appl. No. 11/929,571 Dated Mar. 3, 2011.

Final Office Action from U.S. Appl. No. 12/507,682 Dated Mar. 29, 2011.

Final Office Action from U.S. Appl. No. 11/461,435 Dated May 13, 2010.

Final Office Action From U.S. Appl. No. 11/461,435 Mailed Jan. 28, 2009.

Final Office Action from U.S. Appl. No. 11/515,167 Dated Jun. 3, 2010.

Final Office Action from U.S. Appl. No. 11/553,390 Dated Jun. 24, 2010.

Final Office Action from U.S. Appl. No. 11/588,739 Dated Dec. 15, 2010.

Final Office Action from U.S. Appl. No. 11/672,921 Dated Jul. 23, 2010.

Final Office Action from U.S. Appl. No. 11/672,924 Dated Sep. 7, 2010.

(56) References Cited

OTHER PUBLICATIONS

Final Office Action from U.S. Appl. No. 11/702,960 Dated Jun. 21, 2010.
Final Office Action from U.S. Appl. No. 11/828,182 Dated Dec. 22, 2010.
Final Office Action from U.S. Appl. No. 11/855,805, Dated May 26, 2011.
Final Office Action from U.S. Appl. No. 11/858,518 Mailed Apr. 21, 2010.
Final Office Action from U.S. Appl. No. 11/929,225 Dated Aug. 27, 2010.
Final Office Action from U.S. Appl. No. 11/929,261 Dated Sep. 7, 2010.
Final Office Action from U.S. Appl. No. 11/929,286 Dated Aug. 20, 2010.
Final Office Action from U.S. Appl. No. 11/929,403 Dated Aug. 31, 2010.
Final Office Action from U.S. Appl. No. 11/929,417 Dated Aug. 31, 2010.
Final Office Action from U.S. Appl. No. 11/929,432 Dated Aug. 20, 2010.
Final Office Action from U.S. Appl. No. 11/929,450 Dated Aug. 20, 2010.
Final Office Action from U.S. Appl. No. 11/929,500 Dated Jun. 24, 2010.
Final Office Action from U.S. Appl. No. 11/929,631 Dated Nov. 18, 2010.
Final Office Action from U.S. Appl. No. 11/929,655 Dated Nov. 22, 2010.
Final Office Action from U.S. Appl. No. 11/939,440 Dated May 19, 2011.
Final Office Action from U.S. Appl. No. 11/461,430 mailed on Sep. 8, 2008.
Final Office Action from U.S. Appl. No. 11/461,435 mailed on Jan. 28, 2009.
Final Office Action from U.S. Appl. No. 12/057,306 Dated Jun. 15, 2011.
Final Office Action from U.S. Appl. No. 12/574,628 Dated Mar. 3, 2011.
Final Office Action from U.S. Appl. No. 12/769,428 Dated Jun. 16, 2011.
Final Rejection From U.S. Appl. No. 11/461,437 Mailed Nov. 10, 2009.
Final Rejection from U.S. Appl. No. 11/762,010 Mailed Dec. 4, 2009.
German Office Action From Gennan Patent Application No. 11 2006 002 300.4-55 Mailed Jun. 5, 2009 (With Translation).
German Office Action from German Patent Application No. 11 2006 001 810.8-55 Dated Feb. 18, 2009 (With Translation).
German Office Action from German Patent Application No. 11 2006 002 300.4-55 Dated May 11, 2009 (With Translation).
Great Britain Office Action from GB Patent Application No. GB0803913.3 Dated Mar. 1, 2010.
International Preliminary Examination Report From PCT Application No. PCT/US07/016385 Dated Feb. 3, 2009.
Non-Final Office Action from U.S. Appl. No. 11/461,420 Dated Jul. 23, 2009.
Non-Final Office Action From U.S. Appl. No. 11/461,430 Mailed Feb. 19, 2009.
Non-Final Office Action from U.S. Appl. No. 11/461,435 Dated Aug. 5, 2009.
Non-Final Office Action from U.S. Appl. No. 11/461,437 Dated Jan. 4, 2011.
Non-Final Office Action From U.S. Appl. No. 11/461,437 Mailed Jan. 26, 2009.
Non-Final Office Action From U.S. Appl. No. 11/461,441 Mailed Apr. 2, 2009.
Non-Final Office Action from U.S. Appl. No. 11/515,167 Dated Sep. 25, 2009.
Non-Final Office Action from U.S. Appl. No. 11/515,223 Dated Sep. 22, 2009.
Non-Final Office Action from U.S. Appl. No. 11/538,041 Dated Jun. 10, 2009.
Non-Final Office Action from U.S. Appl. No. 11/553,372 Dated Jan. 5, 2011.
Non-Final Office Action from U.S. Appl. No. 11/553,372 Dated Jun. 25, 2009.
Non-Final Office Action from U.S. Appl. No. 11/553,390 Dated Sep. 9, 2009.
Non-Final Office Action from U.S. Appl. No. 11/553,399 Dated Jul. 7, 2009.
Non-Final Office Action from U.S. Appl. No. 11/588,739 Mailed Dec. 29, 2009.
Non-Final Office Action From U.S. Appl. No. 11/611,374 Mailed Mar. 23, 2009.
Non-Final Office Action from U.S. Appl. No. 11/672,921 Dated May 27, 2011.
Non-Final Office Action from U.S. Appl. No. 11/672,924 Dated Jun. 8, 2011.
Non-Final Office Action from U.S. Appl. No. 11/702,960 Dated Sep. 25, 2009.
Non-Final Office Action from U.S. Appl. No. 11/702,960 Dated Jun. 23, 2011.
Non-Final Office Action from U.S. Appl. No. 11/702,981 Dated Aug. 19, 2009.
Non-Final Office Action from U.S. Appl. No. 11/702,981 Dated Mar. 11, 2009.
Non-Final Office Action from U.S. Appl. No. 11/762,013 Dated Jun. 5, 2009.
Non-Final Office Action from U.S. Appl. No. 11/763,365 Dated Oct. 28, 2009.
Non-Final Office Action from U.S. Appl. No. 11/828,181 Dated Jun. 27, 2011.
Non-Final Office Action from U.S. Appl. No. 11/828,181 Mailed Mar. 2, 2010.
Non-Final Office Action from U.S. Appl. No. 11/828,182 Dated Jun. 27, 2011.
Non-Final Office Action from U.S. Appl. No. 11/828,182 Mailed Mar. 29, 2010.
Non-Final Office Action from U.S. Appl. No. 11/855,805 Dated Sep. 21, 2010.
Non-Final Office Action from U.S. Appl. No. 11/855,826 Dated Jan. 13, 2011.
Non-Final Office Action from U.S. Appl. No. 11/858,518 Dated Aug. 14, 2009.
Non-Final Office Action from U.S. Appl. No. 11/858,518 Dated Sep. 8, 2010.
Non-Final Office Action from U.S. Appl. No. 11/929,225 Dated Jun. 8, 2011.
Non-Final Office Action from U.S. Appl. No. 11/929,403 Dated Mar. 31, 2011.
Non-Final Office Action from U.S. Appl. No. 11/929,432 Mailed Jan. 14, 2010.
Non-Final Office Action from U.S. Appl. No. 11/929,500 Dated Oct. 13, 2009.
Non-Final Office Action from U.S. Appl. No. 11/929,571 Mailed Mar. 3, 2010.
Non-Final Office Action from U.S. Appl. No. 11/929,631 Mailed Mar. 3, 2010.
Non-Final Office Action from U.S. Appl. No. 11/929,636 Mailed Mar. 9, 2010.
Non-Final Office Action from U.S. Appl. No. 11/929,655 Dated Jun. 24, 2011.
Non-Final Office Action from U.S. Appl. No. 11/929,655 Mailed Mar. 3, 2010.
Non-Final Office Action from U.S. Appl. No. 11/939,432 Mailed Apr. 12, 2010.
Non-Final Office Action From U.S. Appl. No. 11/939,432 Mailed Feb. 6, 2009.
Non-Final Office Action from U.S. Appl. No. 11/939,440 Dated Sep. 17, 2010.
Non-final Office Action from U.S. Appl. No. 11/939,432 mailed on Feb. 6, 2009.

(56) References Cited

OTHER PUBLICATIONS

Non-Final Office Action from U.S. Appl. No. 11/941,589 Dated Oct. 1, 2009.
Non-final Office Action from U.S. Appl. No. 11/461,430 mailed on Feb. 19, 2009.
Non-final Office Action from U.S. Appl. No. 11/461,437 mailed on Jan. 26, 2009.
Non-Final Office Action From U.S. Appl. No. 11/762,010 Mailed Mar. 20, 2009.
Non-Final Office Action from U.S. Appl. No. 12/057,306 Dated Oct. 8, 2010.
Non-Final Office Action from U.S. Appl. No. 12/203,100 Dated Dec. 1, 2010.
Non-Final Office Action from U.S. Appl. No. 12/507,682 Mailed Mar. 8, 2010.
Non-Final Office Action from U.S. Appl. No. 12/574,628 Dated Jun. 10, 2010.
Non-Final Office Action from U.S. Appl. No. 12/769,428 Dated Nov. 8, 2010.
Non-Final Office Action from U.S. Appl. No. 12/797,557 Dated Jun. 21, 2011.
Non-Final Office Action from U.S. Appl. No. 12/816,756 Dated Feb. 7, 2011.
Non-Final Office Action from U.S. Appl. No. 12/838,896 Dated Sep. 3, 2010.
Non-Final Office Action From U.S. Appl. No. 12/111,819 Mailed Apr. 27, 2009.
Non-Final Office Action From U.S. Appl. No. 12/111,828 Mailed Apr. 17, 2009.
Non-Final Rejection from U.S. Appl. No. 11/672,924 Mailed Dec. 14, 2009.
Non-Final Rejection from U.S. Appl. No. 11/929,225 Mailed Dec. 14, 2009.
Non-Final Rejection from U.S. Appl. No. 11/672,921 Mailed Dec. 8, 2009.
Non-Final Rejection from U.S. Appl. No. 11/929,261 Mailed Dec. 14, 2009.
Notice of Allowance from U.S. Appl. No. 11/461,430 Dated Sep. 9, 2009.
Notice of Allowance from U.S. Appl. No. 11/515,223 Dated Feb. 4, 2011.
Notice of Allowance from U.S. Appl. No. 11/515,223 Dated Jul. 30, 2010.
Notice of Allowance from U.S. Appl. No. 11/553,372 Dated Sep. 30, 2009.
Notice of Allowance from U.S. Appl. No. 11/553,372 Dated Aug. 4, 2010.
Notice of Allowance from U.S. Appl. No. 11/553,399 Dated Mar. 18, 2011.
Notice of Allowance from U.S. Appl. No. 11/553,399 Dated Oct. 13, 2009.
Notice of Allowance from U.S. Appl. No. 11/553,399 Dated Dec. 3, 2010.
Notice of Allowance from U.S. Appl. No. 11/611,374 Dated Mar. 4, 2011.
Notice of Allowance from U.S. Appl. No. 11/611,374 Dated Sep. 15, 2009.
Notice of Allowance from U.S. Appl. No. 11/611,374 Dated Jul. 19, 2010.
Notice of Allowance from U.S. Appl. No. 11/611,374 Dated Oct. 29, 2010.
Notice of Allowance from U.S. Appl. No. 11/611,374 Dated Jun. 24, 2011.
Notice of Allowance from U.S. Appl. No. 11/702,981 Dated Apr. 25, 2011.
Notice of Allowance from U.S. Appl. No. 11/762,010 Dated Feb. 18, 2011.
Notice of Allowance from U.S. Appl. No. 11/762,010 Dated Jul. 2, 2010.
Notice of Allowance from U.S. Appl. No. 11/762,010 Dated Oct. 22, 2010.
Notice of Allowance from U.S. Appl. No. 11/762,010 Dated Jun. 8, 2011.
Notice of Allowance from U.S. Appl. No. 11/762,013 Dated Feb. 23, 2011.
Notice of Allowance from U.S. Appl. No. 11/762,013 Dated Aug. 17, 2010.
Notice of Allowance from U.S. Appl. No. 11/762,013 Dated Dec. 7, 2010.
Notice of Allowance from U.S. Appl. No. 11/762,013 Dated Jun. 20, 2011.
Notice of Allowance from U.S. Appl. No. 11/763,365 Dated Mar. 1, 2011.
Notice of Allowance from U.S. Appl. No. 11/763,365 Dated Jun. 29, 2010.
Notice of Allowance from U.S. Appl. No. 11/763,365 Dated Oct. 20, 2010.
Notice of Allowance from U.S. Appl. No. 11/763,365 Dated Jun. 24, 2011.
Notice of Allowance from U.S. Appl. No. 11/929,320 Dated May 5, 2011.
Notice of Allowance from U.S. Appl. No. 11/929,320 Dated Sep. 29, 2010.
Notice of Allowance from U.S. Appl. No. 11/929,483 Dated Mar. 4, 2011.
Notice of Allowance from U.S. Appl. No. 11/929,483 Dated Oct. 7, 2010.
Notice of Allowance from U.S. Appl. No. 11/929,483 Dated Jun. 23, 2011.
Notice of Allowance from U.S. Appl. No. 11/929,500 Dated Feb. 24, 2011.
Notice of Allowance from U.S. Appl. No. 11/929,500 Dated Jun. 13, 2011.
Notice of Allowance from U.S. Appl. No. 11/939,432 Dated Feb. 18, 2011.
Notice of Allowance from U.S. Appl. No. 11/939,432 Dated Sep. 24, 2009.
Notice of Allowance from U.S. Appl. No. 11/939,432 Mailed Dec. 1, 2009.
Notice of Allowance from U.S. Appl. No. 11/941,589 Dated Oct. 25, 2010.
Notice of Allowance from U.S. Appl. No. 11/941,589 Dated Jun. 15, 2011.
Notice of Allowance from U.S. Appl. No. 11/474,075 mailed on Nov. 26, 2008.
Notice of Allowance from U.S. Appl. No. 12/144,396 Dated Feb. 1, 2011.
Notice of Allowance from U.S. Appl. No. 12/203,100 Dated Jun. 17, 2011.
Notice of Allowance from U.S. Appl. No. 12/838,896 Dated Apr. 19, 2011.
Office Action from U.S. Appl. No. 11/461,427 mailed on Sep. 5, 2008.
Office Action from U.S. Appl. No. 11/474,076 mailed on Nov. 3, 2008.
Office Action from U.S. Appl. No. 11/524,811 mailed on Sep. 17, 2008.
Search Report and Written Opinion From PCT Application No. PCT/US07/03460 Dated on Feb. 14, 2008.
Search Report From PCT Application No. PCT/US10/038041 Dated Aug. 23, 2010.
Supplemental European Search Report and Search Opinion issued Sep. 21, 2009 in European Application No. 07870726.2, 8 pp.
Fang et al., W. Power Complexity Analysis of Adiabatic SRAM, 6th Int. Conference On ASIC, vol. 1, Oct. 2005, pp. 334-337.
IB-US2006024360 Search Report. Jan. 10, 2008.
IB-US2006024360 Written Opinion. Nov. 21, 2007.
IB-US2006634390 Search Report. Nov. 21, 2007.
IB-US2006634390 Written Opinion. Nov. 21, 2007.
Kellerbauer, R. "Die Schnelle Million". Retrieved Apr. 1, 2008. Published on the Internet (German): <URL:http://ct.coremelt.netlhtml191112/276/art.htm>.

(56) References Cited

OTHER PUBLICATIONS

Kellerbauer, R. "The Quick Million". Retrieved Apr. 1, 2008. Translated from as published on the Internet: <URL:http://ct.coremelt.netlhtmI/91112/276/art.htm>.

Notice of Allowance from U.S. Appl. No. 11/611,374 Mailed Apr. 5, 2010.

Notice of Allowance From U.S. Appl. No. 11/611,374 Mailed Nov. 30, 2009.

Notice of Allowance From U.S. Appl. No. 12/111,828 Mailed Dec. 15, 2009.

Notice of Allowance from U.S. Appl. No. 12/111,819 Mailed Mar. 10, 2010.

Notice of Allowance From U.S. Appl. No. 12/111,819 Mailed Nov. 20, 2009.

Pavan et al., P. A Complete Model of E2PROM Memory Cells for Circuit Simulations, IEEE Transactions on Computer-Aided Design of Integrated Circuits and Systems, vol. 22, No. 8, Aug. 2003, pp. 1072-1079.

Skerlj et al. "Buffer Device for memory modules". 2006. Qimonda—German IP Publication as DE2006J54505 2006E53858DE.

Using Two Chip Selects to Enable Quad Rank. Retrieved on Feb. 26, 2008. From IP.com # 000132468D.

Wu et al., "eNVy: A Non-Volatile, Main Memory Storage System", ASPLOS-VI Proceedings, Oct. 4-7, 1994, pp. 86-97.

Wu et al., "eNVy: A Non-Volatile, Main Memory Storage System," ASPLOS-VI Proceedings—Sixth International Conference on Architectural Support for Programming Languages and Operating Systems, San Jose, California, Oct. 4-7, 1994. SIGARCH Computer Architecture News 22(Special Issue Oct. 1994).

Non-Final Office Action from U.S. Appl. No. 12/378,328 Dated Jul. 15, 2011.

Final Office Action from U.S. Appl. No. 11/461,420 Dated Jul. 20, 2011.

Notice of Allowance from U.S. Appl. No. 11/461,437 Dated Jul. 25, 2011.

Notice of Allowance from U.S. Appl. No. 11/702,981 Dated Aug. 5, 2011.

Notice of Allowability from U.S. Appl. No. 11/855,826 Dated Aug. 15, 2011.

Non-Final Office Action from U.S. Appl. No. 12/574,628 Dated Sep. 20, 2011.

Non-Final Office Action from U.S. Appl. No. 11/858,518 Dated Sep. 27, 2011.

Notice of Allowance from U.S. Appl. No. 11/929,571 Dated Sep. 27, 2011.

Notice of Allowance from U.S. Appl. No. 11/929,500 Dated Sep. 27, 2011.

Notice of Allowance from U.S. Appl. No. 11/941,589 Dated Sep. 30, 2011.

Notice of Allowance from U.S. Appl. No. 12/816,756 Dated Oct. 3, 2011.

Non-Final Office Action from U.S. Appl. No. 12/508,496 Dated Oct. 11, 2011.

Non-Final Office Action from U.S. Appl. No. 11/588,739 Dated Oct. 13, 2011.

Notice of Allowance from U.S. Appl. No. 11/939,432 Dated Oct. 24, 2011.

Non-Final Office Action from U.S. Appl. No. 11/929,631 Dated Nov. 1, 2011.

Non-Final Office Action from U.S. Appl. No. 11/553,372 Dated Nov. 14, 2011.

Notice of Allowance from U.S. Appl. No. 11/515,223 Dated Nov. 29, 2011.

Notice of Allowance from U.S. Appl. No. 12/769,428 Dated Nov. 28, 2011.

Final Office Action from U.S. Appl. No. 11/939,440 Dated Dec. 12, 2011.

Notice of Allowance from U.S. Appl. No. 12/797,557 Dated Dec. 28, 2011.

Office Action, including English translation, from co-pending Japanese application No. 2008-529353, Dated Jan. 10, 2012.

Notice of Allowance from U.S. Appl. No. 12/838,896 Dated Jan. 18, 2012.

Final Office Action from U.S. Appl. No. 11/929,655 Dated Jan. 19, 2012.

Final Office Action from U.S. Appl. No. 12/378,328 Dated Feb. 3, 2012.

Final Office Action from U.S. Appl. No. 11/672,921 Dated Feb. 16, 2012.

Final Office Action from U.S. Appl. No. 11/672,924 Dated Feb. 16, 2012.

Final Office Action from U.S. Appl. No. 11/929,225 Dated Feb. 16, 2012.

International Search Report for Application No. EP12150807 Dated Feb. 16, 2012.

Final Office Action from U.S. Appl. No. 11/828,181 Dated Feb. 23, 2012.

Non-Final Office Action from U.S. Appl. No. 11/461,520 Dated Feb. 29, 2012.

Notice of Allowance from U.S. Appl. No. 12/574,628 Dated Mar. 6, 2012.

Non-Final Office Action from U.S. Appl. No. 13/276,212 Dated Mar. 15, 2012.

Non-Final Office Action from U.S. Appl. No. 13/343,612 Dated Mar. 29, 2012.

Notice of Allowance from U.S. Appl. No. 11/939,440 Dated Mar. 30, 2012.

European Search Report from co-pending European application No. 11194876.6-2212/2450798, Dated Apr. 12, 2012.

European Search Report from co-pending European application No. 11194862.6-2212/2450800, Dated Apr. 12, 2012.

Notice of Allowance from U.S. Appl. No. 11/929,636, Dated Apr. 17, 2012.

Final Office Action from U.S. Appl. No. 11/858,518, Dated Apr. 17, 2012.

European Search Report from co-pending European application No. 11194883.2-2212, Dated Apr. 27, 2012.

Non-Final Office Action from U.S. Appl. No. 11/553,372, Dated May 3, 2012.

Notice of Allowance from U.S. Appl. No. 11/929,631, Dated May 3, 2012.

Non-Final Office Action from U.S. Appl. No. 13/165,713, Dated May 22, 2012.

Non-Final Office Action from U.S. Appl. No. 12/144,396, Dated May 29, 2012.

Non-Final Office Action from U.S. Appl. No. 13/165,713, Dated May 31, 2012.

Non-Final Office Action from U.S. Appl. No. 13/280,251, Dated Jun. 12, 2012.

Final Office Action from U.S. Appl. No. 11/855,805, Dated Jun. 14, 2012.

Office Action, including English translation, from co-pending Japanese application No. 2008-529353, dated Jul. 31, 2012.

Final Office Action from U.S. Appl. No. 13/315,933, Dated Aug. 24, 2012.

Final Office Action from U.S. Appl. No. 13/276,212, Dated Aug. 30, 2012.

Non-Final Office Action from U.S. Appl. No. 13/367,182, Dated Aug. 31, 2012.

Notice of Allowance from U.S. Appl. No. 11/461,420, Dated Sep. 5, 2012.

Final Office Action from U.S. Appl. No. 13/280,251, Dated Sep. 12, 2012.

Non-Final Office Action from U.S. Appl. No. 11/929,225, Dated Sep. 17, 2012.

Notice of Allowance from U.S. Appl. No. 12/508,496, Dated Sep. 17, 2012.

Non-Final Office Action from U.S. Appl. No. 11/672,921, Dated Oct. 1, 2012.

Notice of Allowance from U.S. Appl. No. 12/057,306, Dated Oct. 10, 2012.

(56) References Cited

OTHER PUBLICATIONS

Notice Allowance from U.S. Appl. No. 12/144,396, Dated Oct. 11, 2012.
Final Office Action from U.S. Appl. No. 11/672,924, Dated Feb. 1, 2013.
Non-Final Office Action from U.S. Appl. No. 13/260,650, Dated Feb. 1, 2013.
Notice of Allowance from U.S. Appl. No. 13/141,844, Dated Feb. 5, 2013.
Notice of Allowance from U.S. Appl. No. 12/378,328, Dated Feb. 27, 2013.
Non-Final Office Action from U.S. Appl. No. 13/536,093, Dated Mar. 1, 2013.
Notice of Allowance from U.S. Appl. No. 11/461,435, Dated Mar. 6, 2013.
Office Action from co-pending Japanese patent application No. 2012-132119, Dated Mar. 6, 2013.
Notice of Allowance from U.S. Appl. No. 13/471,283, Dated Mar. 21, 2013.
Extended European Search Report for co-pending European patent application No. EP12150807.1, dated Feb. 1, 2013, mailed Mar. 22, 2013.
Notice of Allowance from U.S. Appl. No. 13/618,246, Dated Apr. 23, 2013.
English translation of Office Action from co-pending Korean patent application No. KR 1020087019582, Dated Mar. 13, 2013.
Notice of Allowance from U.S. Appl. No. 13/182,234, Dated May 1, 2013.
Final Office Action from U.S. Appl. No. 13/315,933, Dated May 3, 2013.
English Translatin of Office Action from co-pending Korean patent application No. 10-2013-7004006, Dated Apr. 12, 2013.
Non-Final Office Action from U.S. Appl. No. 13/620,793, Dated May 6, 2013.
Non-Final Office Action from U.S. Appl. No. 13/620,565, Dated May 24, 2013.
Final Office Action from U.S. Appl. No. 11/929,225, Dated May 24, 2013.
Final Office Action from U.S. Appl. No. 11/672,921, Dated May 24, 2013.
Notice of Allowance from U.S. Appl. No. 11/929,631, Dated May 28, 2013.
Notice of Allowance from U.S. Appl. No. 13/620,424, Dated May 29, 2013.
Notice of Allowance from U.S. Appl. No. 13/341,844, Dated May 30, 2013.
Non-Final Office Action from U.S. Appl. No. 13/455,691, Dated Jun. 4, 2013.
Non-Final Office Action from U.S. Appl. No. 13/620,199, Dated Jun. 17, 2013.
Non-Final Office Action from U.S. Appl. No. 13/620,207, Dated Jun. 20, 2013.
Non-Final Office Action from U.S. Appl. No. 11/828,182, Dated Jun. 20, 2013.
Final Office Action from U.S. Appl. No. 11/828,181, Dated Jun. 20, 2013.
Non-Final Office Action from U.S. Appl. No. 11/929,655, Dated Jun. 21, 2013.
Notice of Allowance from U.S. Appl. No. 13/597,895, Dated Jun. 25, 2013.
Non-Final Office Action from U.S. Appl. No. 13/620,645, Dated Jun. 26, 2013.
Notice of Allowance from U.S. Appl. No. 13/471,283, Dated Jun. 28, 2013.
Notice of Allowance from U.S. Appl. No. 13/181,747, Dated Jul. 9, 2013.
Notice of Allowance from U.S. Appl. No. 11/515,223, Dated Jul. 18, 2013.
Notice of Allowance from U.S. Appl. No. 13/182,234, Dated Jul. 22, 2013.
Notice of Allowance from U.S. Appl. No. 13/181,716, Dated Jul. 22, 2013.
Non-Final Office Action from U.S. Appl. No. 13/620,233, Dated Aug. 2, 2013.
Final Office Action from U.S. Appl. No. 13/367,182, Dated Aug. 8, 2013.
Notice of Allowance from U.S. Appl. No. 13/615,008, Dated Aug. 15, 2013.
Notice of Allowance from U.S. Appl. No. 13/620,425, Dated Aug. 20, 2013.
Non-Final Office Action from U.S. Appl. No. 13/620,601, Dated Aug. 23, 2013.
Non-Final Office Action from U.S. Appl. No. 12/507,683, Dated Aug. 27, 2013.
Non-Final Office Action from U.S. Appl. No. 13/315,933, Dated Aug. 27, 2013.
Final Office Action from U.S. Appl. No. 13/620,650, Dated Aug. 30, 2013.
Notice of Allowance from U.S. Appl. No. 13/620,424, Dated Sep. 11, 2013.
Non-Final Office Action from U.S. Appl. No. 13/620,291, Dated Sep. 12, 2013.
Notice of Allowance from U.S. Appl. No. 13/341,844, Dated Sep. 17, 2013.
Notice of Allowance from U.S. Appl. No. 13/620,412, dated Sep. 25, 2013.
Non-Final Office Action from U.S. Appl. No. 13/343,852, dated Sep. 27, 2013.
English Translation of Office Action from co-pending Korean patent application No. 10-2008-7019582, dated Sep. 16, 2013.
Notice of Allowance from U.S. Appl. No. 13/620,565, dated Sep. 27, 2013.
Non-Final Office Action from U.S. Appl. No. 13/279,068, dated Sep. 30, 2013.
Notice of Allowance from U.S. Appl. No. 13/620,207, dated Oct. 9, 2013.
Non-Final Office Action from U.S. Appl. No. 13/898,002, dated Oct. 10, 2013.
Notice of Allowance from U.S. Appl. No. 13/471,283, dated Oct. 15, 2013.
Notice of Allowance from U.S. Appl. No. 11/515,223, dated Oct. 24, 2013.
Notice of Allowance from U.S. Appl. No. 13/181,747, dated Oct. 28, 2013.
Notice of Allowance from U.S. Appl. No. 13/597,895, dated Oct. 29, 2013.

\* cited by examiner

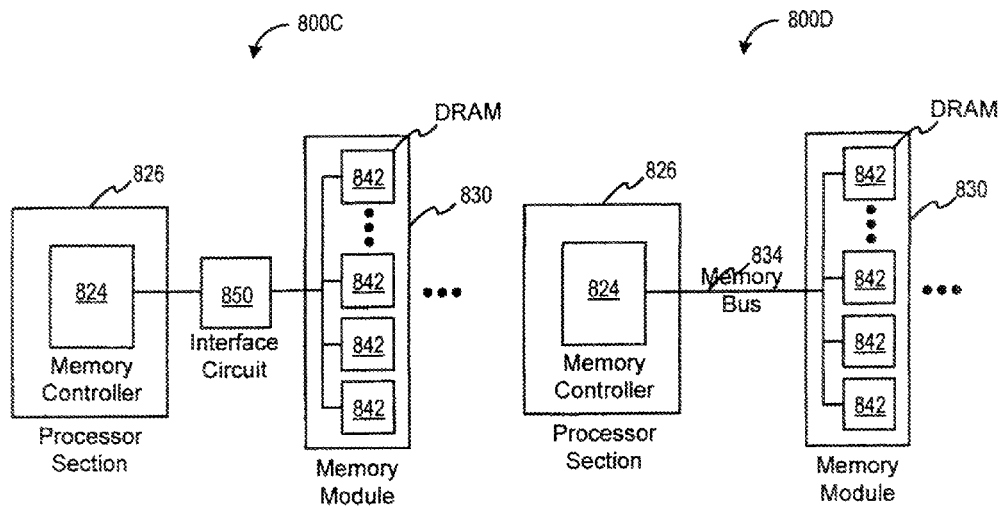
FIG. 8C
FIG. 8D
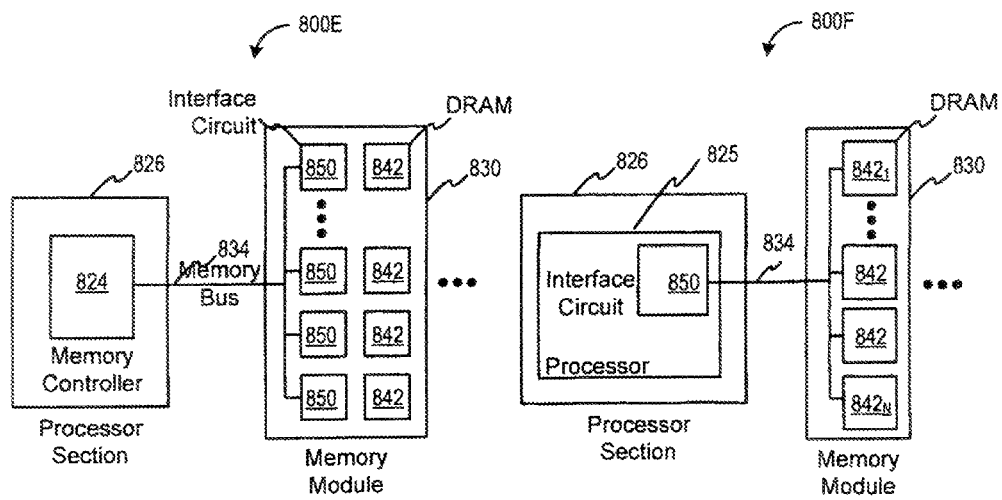
FIG. 8E
FIG. 8F

EMULATION OF ABSTRACTED DIMMS USING ABSTRACTED DRAMS

CROSS REFERENCE TO RELATED APPLICATIONS

This is a divisional application from, and hereby claims priority under 35 U.S.C. 120 to, pending U.S. patent application Ser. No. 12/378,328 filed Feb. 14, 2009, entitled "Emulation of Abstracted DIMMS using Abstracted DRAMS," which in turn claims the priority benefit of U.S. Provisional Patent Application No. 61/030,534, filed on Feb. 21, 2008. The subject matter of the above related application is hereby incorporated herein by reference, however, insofar as any definitions, information used for claim interpretation, etc. from the above parent application conflict with that set forth herein, such definitions, information, etc. in the present application should apply.

FIELD OF THE INVENTION

The present invention relates to semiconductor memory and more particularly to memory subsystems used in computing platforms.

BACKGROUND

Conventional memory systems typically consist of one or more memory devices, such as dynamic random access memories (e.g. DRAMs), mounted on a Printed Circuit Board (PCB) called a Dual In-line Memory Module (DIMM). The memory system is in communication with a memory controller (MC) which in turn is in communication with a processor subsystem or central processing unit (CPU) or microprocessor. In some configurations, the memory controller is physically subsumed into the same physical chip as the processor. And in other configurations the memory controller may be just one of many logical components comprising a memory controller hub (MCH). A memory controller hub typically supports completely separate and distinct memory address spaces, often using different types of semiconductor memory for different purposes. For example, a memory controller may support the use of video DRAM for graphics applications, flash memory for disk-drive acceleration, and commodity DRAM as the processor's main external memory.

The limitations imposed by memory protocols, traditional memory subsystem architectures, standards, processor-specific memory access models, end-user configurability requirements, power constraints, or combinations of those limitations tend to interact in such a manner that reduce performance and result in non-optimal memory subsystems.

The disclosures herein describe methods and apparatus for improving memory subsystems by abstracting various properties of the memory subsystem and their components. The principles developed herein apply to embodiments of abstracted memories and abstracted DIMMs.

BRIEF SUMMARY

The present invention sets forth an abstracted memory subsystem comprising abstracted memories, which each may be configured to present memory-related characteristics onto a memory system interface. The characteristics can be presented on the memory system interface via logic signals or protocol exchanges, and the characteristics may include any one or more of, an address space, a protocol, a memory type, a power management rule, a number of pipeline stages, a number of banks, a mapping to physical banks, a number of ranks, a timing characteristic, an address decoding option, a bus turnaround time parameter, an additional signal assertion, a sub-rank, a number of planes, or other memory-related characteristics. Same embodiments include an intelligent register device and/or, an intelligent buffer device. One advantage of the disclosed subsystem is that memory performance may be optimized regardless of the specific protocols used by the underlying memory hardware devices.

BRIEF DESCRIPTION OF THE DRAWINGS

FIGS. 8A through 8F illustrate a computer platform that includes at least one processing element and at least one abstracted memory module, according to various embodiments of the present invention.

DETAILED DESCRIPTION

Figure 1A:
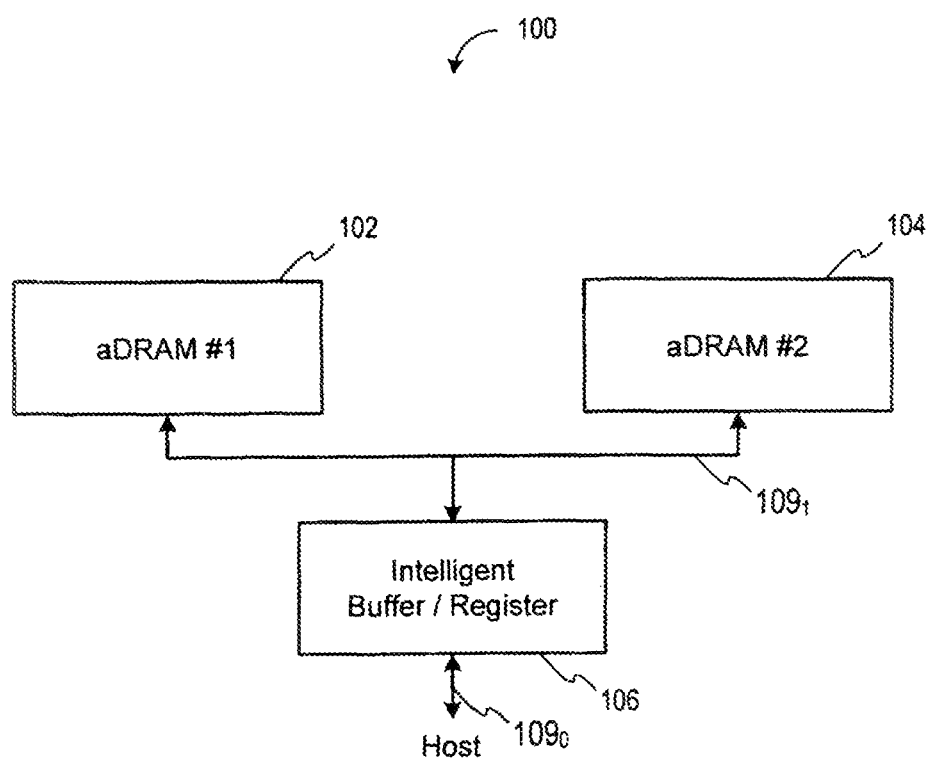
FIG. 1A: Depicts an embodiment of the invention showing multiple abstracted memories behind an intelligent register/buffer.

More illustrative information will now be set forth regarding various optional architectures and features of different embodiments with which the foregoing frameworks may or may not be implemented, per the desires of the user. It should be strongly noted that the following information is set forth for illustrative purposes and should not be construed as limiting in any manner. Any of the following features may be optionally incorporated with or without the other features described.

A conventional memory system is composed of DIMMs that contain DRAMs. Typically modern DIMMs contain synchronous DRAM (SDRAM). DRAMs come in different organizations, thus an x4 DRAM provides 4 bits of information at a time on a 4-bit data bus. These data bits are called DQ bits. The 1 Gb DRAM has an array of 1 billion bits that are addressed using column and row addresses. A 1 Gb DDR3×4 SDRAM with x4 organization (4 DQ bits that comprise the data bus) has 14 row address bits and 11 column address bits. A DRAM is divided into areas called banks and pages. For example a 1 Gb DDR3×4 SDRAM has 8 banks and a page size of 1 KB. The 8 banks are addressed using 3 bank address bits.

A DIMM consists of a number of DRAMs. DIMMs may be divided into ranks. Each rank may be thought of as a section of a DIMM controlled by a chip select (CS) signal provided to the DIMM. Thus a single-rank DIMM has a single CS signal from the memory controller. A dual-rank DIMM has two CS signals from the memory controller. Typically DIMMs are available as single-rank, dual-rank, or quad-rank. The CS signal effectively acts as an on/off switch for each rank.

DRAMs also provide signals for power management. In a modern DDR2 and DDR3 SDRAM memory system, the memory controller uses the CKE signal to move DRAM devices into and out of low-power states.

DRAMs provide many other signals for data, control, command, power and so on, but in this description we will focus on the use of the CS and CKE signals described above. We also refer to DRAM timing parameters in this specification. All physical DRAM and physical DIMM signals and timing parameters are used in their well-known sense, described for example in JEDEC specifications for DDR2 SDRAM, DDR3 SDRAM, DDR2 DIMMs, and DDR3 DIMMs and available at www.jedec.org.

A memory system is normally characterized by parameters linked to the physical DRAM components (and the physical page size, number of banks, organization of the DRAM—all of which are fixed), and the physical DIMM components (and the physical number of ranks) as well as the parameters of the memory controller (command spacing, frequency, etc.). Many of these parameters are fixed, with only a limited number of variable parameters. The few parameters that are variable are often only variable within restricted ranges. To change the operation of a memory system you may change parameters associated with memory components, which can be difficult or impossible given protocol constraints or physical component restrictions. An alternative and novel approach is to change the definition of DIMM and DRAM properties, as seen by the memory controller. Changing the definition of DIMM and DRAM properties may be done by using abstraction. The abstraction is performed by emulating one or more physical properties of a component (DIMM or DRAM, for example) using another type of component. At a very simple level, for example, just to illustrate the concept of abstraction, we could define a memory module in order to emulate a 2 Gb DRAM using two 1 Gb DRAMs. In this case the 2 Gb DRAM is not real; it is an abstracted DRAM that is created by emulation.

Continuing with the notion of a memory module, a memory module might include one or more physical DIMMs, and each physical DIMM might contain any number of physical DRAM components. Similarly a memory module might include one or more abstracted DIMMs, and each abstracted DIMM might contain any number of abstracted DRAM components, or a memory module might include one or more abstracted DIMMs, and each abstracted DIMM might contain any number of abstracted memory components constructed from any type or types or combinations of physical or abstracted memory components.

The concepts described in embodiments of this invention go far beyond this simple type of emulation to allow emulation of abstracted DRAMs with abstracted page sizes, abstracted banks, abstracted organization, as well as abstracted DIMMs with abstracted ranks built from abstracted DRAMs. These abstracted DRAMs and abstracted DIMMs may then also have abstracted signals, functions, and behaviors. These advanced types of abstraction allow a far greater set of parameters and other facets of operation to be changed and controlled (timing, power, bus connections). The increased flexibility that is gained by the emulation of abstracted components and parameters allows, for example, improved power management, better connectivity (by using a dotted DQ bus, formed when two or more DQ pins from multiple memory chips are combined to share one bus), dynamic configuration of performance (to high-speed or low-power for example), and many other benefits that were not achievable with prior art designs.

As may be recognized by those skilled in the art, an abstracted memory apparatus for emulation of memory presents any or all of the abovementioned characteristics (e.g. signals, parameters, protocols, etc.) onto a memory system interface (e.g. a memory bus, a memory channel, a memory controller bus, a front-side-bus, a memory controller hub bus, etc.). Thus, presentation of any characteristic or combination of characteristics is measurable at the memory system interface. In some cases, a measurement may be performed merely by measurement of one or more logic signals at one point in time. In other cases, and in particular in the case of an abstracted memory apparatus in communication over a bus-oriented memory system interface, a characteristic may be presented via adherence to a protocol. Of course, measurement may be performed by measurement of logic signals or combinations or logic signals over several time slices, even in absence of any known protocol.

Using the memory system interface, and using techniques, and as are discussed in further detail herein, an abstracted memory apparatus may present a wide range of characteristics including, an address space, a plurality of address spaces, a protocol, a memory type, a power management rule, a power management mode, a power down operation, a number of pipeline stages, a number of banks, a mapping to physical banks, a number of ranks, a timing characteristic, an address decoding option, an abstracted CS signal, a bus turnaround time parameter, an additional signal assertion, a sub-rank, a plane, a number of planes, or any other memory-related characteristic for that matter.

Abstracted Dram Behind Buffer Chip

The first part of this disclosure describes the use of a new concept called abstracted DRAM (aDRAM). The specification, with figures, describes how to create aDRAM by decoupling the DRAM (as seen by a host perspective) from the physical DRAM chips. The emulation of aDRAM has many benefits, such as increasing the performance of a memory subsystem.

Figure 1B:
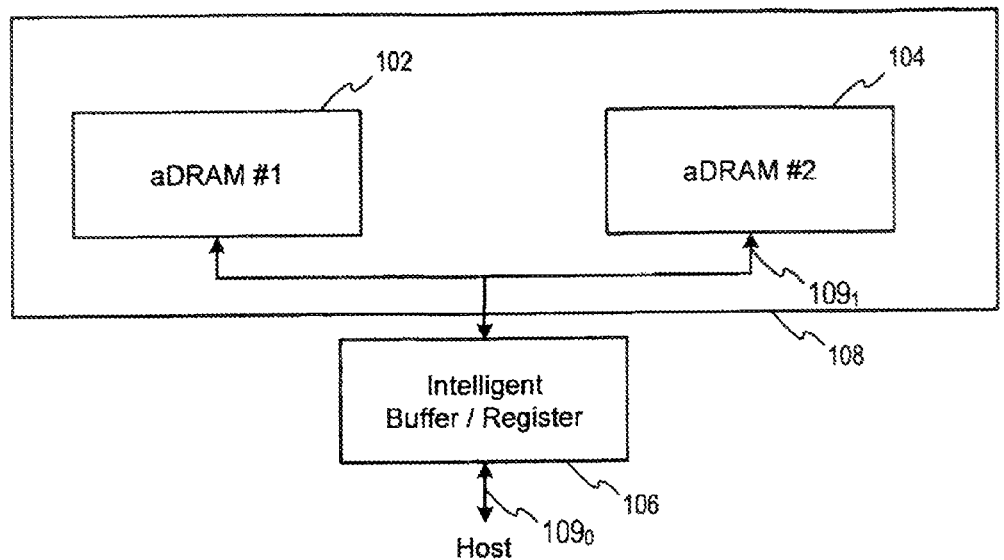
FIG. 1B: Depicts an embodiment of the invention showing multiple abstracted memories on a single PCB behind an intelligent register/buffer.
Figure 1C:
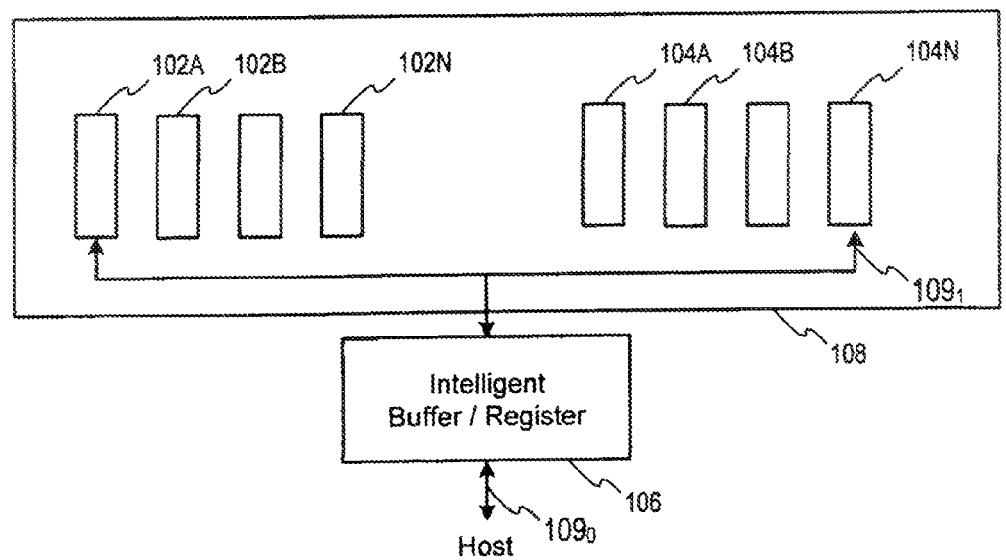
FIG. 1C: Depicts an embodiment of the invention showing multiple abstracted memories on a DIMM behind an intelligent register/buffer.

As a general example, FIGS. 1A-1C depict an emulated subsystem 100, including a plurality of abstracted DRAM (aDRAM) 102, 104, each connected via a memory interface 1091, and each with their own address spaces disposed electrically behind an intelligent buffer chip 106, which is in communication over a memory interface 1090 with a host subsystem (not shown). In such a configuration, the protocol requirements and limitations imposed by the host architecture and host generation are satisfied by the intelligent buffer chip. In this embodiment, one or more of the aDRAMs may individually use a different and even incompatible protocol or architecture as compared with the host, yet such differences are not detectable by the host as the intelligent buffer chip performs all necessary protocol translation, masking and adjustments to emulate the protocols required by the host.

As shown in FIG. 1A, aDRAM 102 and aDRAM 104 are behind the intelligent buffer/register 106. In various embodiments, the intelligent buffer/register may present to the host the aDRAM 102 and aDRAM 104 memories, each with a set of physical or emulated characteristics, (e.g. address space, timing, protocol, power profile, etc). The sets of characteristics presented to the host may differ between the two abstracted memories. For example, each of the aDRAMs may actually be implemented using the same type of physical memory; however, in various embodiments the plurality of address spaces may be presented to the host as having different logical or emulated characteristics. For example, one aDRAM might be optimized for timing and/or latency at the expense of power, while another aDRAM might be optimized for power at the expense of timing and/or latency.

Of course, the embodiments that follow are not limited to two aDRAMs, any number may be used (including using just one aDRAM).

In the embodiment shown in FIG. 1B, the aDRAMs (e.g. 102 and 104) may be situated on a single PCB 108. In such a case, the intelligent buffer/register situated between the memories and the host may present to the host over memory interface 1090 a plurality of address spaces as having different characteristics.

In another embodiment, shown in FIG. 1C, the aDRAMs (e.g. 102A-102N and 104A-104N) may include a plurality of memories situated on a single industry standard DIMM and presenting over memory interface 1091. In such a case, the intelligent buffer/register situated between the aDRAMs and the host may present a plurality of address spaces to the host, where each address space may have different characteristics. Moreover, in some embodiments, including but not limited to the embodiments of FIG. 1A, 1B, or 1C, any of the characteristics whether as a single characteristic or as a grouped set of characteristics may be changed dynamically. That is, in an earlier segment of time, a first address space may be optimized for timing; with a second address space is optimized for power. Then, in a later segment of time, the first address space may be optimized for power, with the second address space optimized for timing. The duration of the aforementioned segment of time is arbitrary, and can be characterized as a boot cycle, or a runtime of a job, runtime of round-robin time slice, or any other time slice, for that matter.

Merely as optional examples of alternative implementations, the aDRAMs may be of the types listed in Table 1, below, while the intelligent buffer chip performs within the specification of each listed protocol. The protocols listed in Table 1 ("DDR2," "DDR3," etc.) are well known industry standards. Importantly, embodiments of the invention are not limited to two aDRAMs.

TABLE 1

| Host Interface Type | ADRAM #1 Type | ADRAM #2 Type |
|---|---|---|
| DDR2 | DDR2 | DDR2 |
| DDR3 | DDR3 | DDR3 |
| DDR3 | DDR2 | DDR2 |
| GDDR5 | DDR3 | DDR3 |
| LPDDR2 | LPDDR2 | NOR Flash |
| DDR3 | LPDDR2 | LPDDR2 |
| GDDR3 | DDR3 | NAND Flash |

Abstracted Dram Having Adjustable Power Management Characteristics

Figure 2:
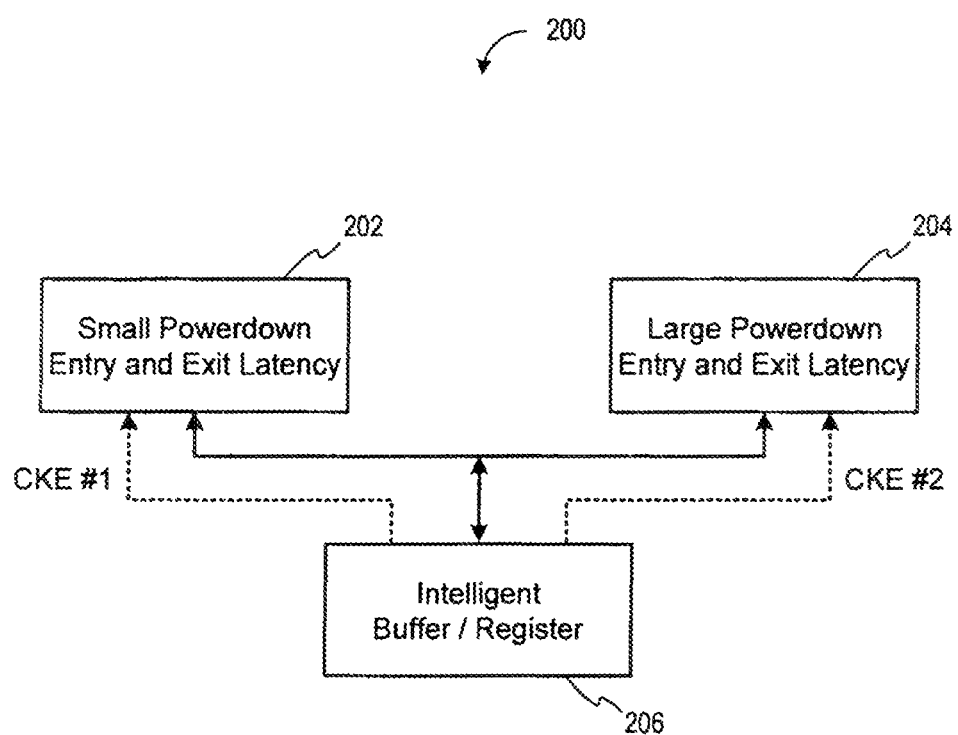
FIG. 2: Depicts an embodiment of the invention using multiple CKEs to multiple abstracted memories on a DIMM behind an intelligent register/buffer.

Use of an intelligent buffer chip permits different memory address spaces to be managed separately without host or host memory controller intervention. FIG. 2 shows two memory spaces corresponding to two aDRAMs, 202 and 204, each being managed according to a pre-defined or dynamically tuned set of power management rules or characteristics. In particular, a memory address space managed according to a conservative set of power management rules (e.g. in address space 202) is managed completely independently from a memory address space managed according to an aggressive set of power management rules (e.g. in address space 204) by an intelligent buffer 206.

In embodiment 200, illustrated in FIG. 2, two independently controlled address spaces may be implemented using an identical type of physical memory. In other embodiments, the two independently controlled address spaces may be implemented with each using a different type of physical memory.

In other embodiments, the size of the address space of the memory under conservative management 202 is programmable, and applied to the address space at appropriate times, and is controlled by the intelligent register in response to commands from a host (not shown). The address space of the memory at 204 is similarly controlled to implement a different power management regime.

The intelligent buffer can present to the memory controller a plurality of timing parameter options, and depending on the specific selection of timing parameters, engage more aggressive power management features as described.

Abstracted Dram Having Adjustable Timing Characteristics

In the embodiment just described, the characteristic of power dissipation differs between the aDRAMs with memory address space 202 and memory address space 204. In addition to differing power characteristics, many other characteristics are possible when plural aDRAMs are placed behind an intelligent buffer, namely latency, configuration characteristics, and timing parameters. For example, timing and latency parameters can be emulated and changed by altering the behavior and details of the pipeline in the intelligent buffer interface circuit. For example, a pipeline associated with an interface circuit within a memory device may be altered by changing the number of stages in the pipeline to increase latency. Similarly, the number of pipeline stages may be reduced to decrease latency. The configuration may be altered by presenting more or fewer banks for use by the memory controller.

Abstracted Dram Having Adjustable tRP, tRCD, and tWL Characteristics

In one such embodiment, which is capable of presenting different aDRAM timing characteristics, the intelligent buffer may present to the controller different options for tRP, a well-known timing parameter that specifies DRAM row-precharge timing. Depending on the amount of latency added to tRP, the intelligent buffer may be able to lower the clock-enable signal to one or more sets of memory devices, (e.g. to deploy clock-enable-after-precharge, or not to deploy it, depending on tRP). A CKE signal may be used to enable and disable clocking circuits within a given integrated circuit. In DRAM devices, an active ("high") CKE signal enables clocking of internal logic, while an inactive ("low") CKE signal generally disables clocks to internal circuits. The CKE signal is set active prior to a DRAM device performing reads or writes. The CKE signal is set inactive to establish low-power states within the DRAM device.

In a second such embodiment capable of presenting different aDRAM timing characteristics, the intelligent buffer may present to the controller different options for tRCD, a well-known timing parameter that specifies DRAM row-to-column delay timing. Depending on the amount of latency added to tRCD, the intelligent buffer may place the DRAM devices into a regular power down state, or an ultra-deep power down state that can enable further power savings. For example, a DDR3 SDRAM device may be placed into a regular precharge-powerdown state that consumes a reduced amount of current known as "IDD2P (fast exit)," or a deep precharge-powerdown state that consumes a reduced amount of current known as "IDD2P (slow exit)," where the slow exit option is considerably more power efficient.

In a third embodiment capable of presenting different aDRAM timing characteristics, the intelligent buffer may present to the controller different options for tWL, the write-latency timing parameter. Depending on the amount of latency added to tWL, the intelligent buffer may be able to lower the clock-enable signal to one or more sets of memory devices. (e.g. to deploy CKE-after-write, or not to deploy it, depending on tWL).

Changing Configurations to Enable/Disable Aggressive Power Management

Different memory (e.g. DRAM) circuits using different standards or technologies may provide external control inputs for power management. In DDR2 SDRAM, for example, power management may be initiated using the CKE and CS inputs and optionally in combination with a command to place the DDR2 SDRAM in various powerdown modes. Four power saving modes for DDR2 SDRAM may be utilized, in accordance with various different embodiments (or even in combination, in other embodiments). In particular, two active powerdown modes, precharge powerdown mode, and self refresh mode may be utilized. If CKE is de-asserted while CS is asserted, the DDR2 SDRAM may enter an active or precharge power down mode. If CKE is de-asserted while CS is asserted in combination with the refresh command, the DDR2 SDRAM may enter the self-refresh mode. These various powerdown modes may be used in combination with power-management modes or schemes. Examples of power-management schemes will now be described.

One example of a power-management scheme is the CKE-after-ACT power management mode. In this scheme the CKE signal is used to place the physical DRAM devices into a low-power state after an ACT command is received. Another example of a power-management scheme is the CKE-after-precharge power management mode. In this scheme the CKE signal is used to place the physical DRAM devices into a low-power state after a precharge command is received. Another example of a power-management scheme is the CKE-after-refresh power management mode. In this scheme the CKE signal is used to place the physical DRAM devices into a low-power state after a refresh command is received. Each of these power-management schemes have their own advantages and disadvantages determined largely by the timing restrictions on entering into and exiting from the low-power states. The use of an intelligent buffer to emulate abstracted views of the DRAMs greatly increases the flexibility of these power-management modes and combinations of these modes, as will now be explained.

So the configurations of JEDEC-compliant memories expose fewer than all of the banks comprised within a physical memory device. In the case that not all of the banks of the physical memory devices are exposed, part of the banks that are not exposed can be placed in lower power states than those that are exposed. That is, the intelligent buffer can present to the memory controller a plurality of configuration options, and depending on the specific selection of configuration, engage more aggressive power management features.

In one embodiment, the intelligent buffer may be configured to present to the host controller more banks at the expense of a less aggressive power-management mode. Alternatively, the intelligent buffer can present to the memory controller fewer banks and enable a more aggressive power-management mode. For example, in a configuration where the intelligent buffer presents 16 banks to the memory controller, when 32 banks are available from the memory devices, the CKE-after-ACT power management mode can at best keep half of the memory devices in low power state under normal operating conditions. In contrast, in a different configuration where the intelligent buffer presents 8 banks to the memory controller, when 32 banks are available from the memory devices, the CKE-after-ACT power management mode can keep 3 out of 4 memory devices in low power states.

For all embodiments, the power management modes may be deployed in addition to other modes. For example, the CKE-after-precharge power management mode may be deployed in addition to CKE-after-activate power management mode, and the CKE-after-activate power management mode may itself be deployed in addition to the CKE-after-refresh power management mode.

Changing Abstracted Dram CKE Timing Behavior to Control Power Management

In another embodiment, at least one aspect of power management is affected by control of the CKE signals. That is, manipulating the CKE control signals may be used in order to place the DRAM circuits in various power states. Specifically, the DRAM circuits may be opportunistically placed in a precharge power down mode using the clock enable (CKE) input of the DRAM circuits. For example, when a DRAM circuit has no open pages, the power management scheme may place that DRAM circuit in the precharge power down mode by de-asserting the CKE input. The CKE inputs of the DRAM circuits, possibly together in a stack, may be controlled by the intelligent buffer chip, by any other chip on a DIMM, or by the memory controller in order to implement the power management scheme described hereinabove. In one embodiment, this power management scheme may be particularly efficient when the memory controller implements a closed-page policy.

In one embodiment, one abstracted bank is mapped to many physical banks, allowing the intelligent buffer to place inactive physical banks in a low power mode. For example, bank 0 of a 4 Gb DDR2 SDRAM, may be mapped (by a buffer chip or other techniques) to two 256 Mb DDR2 SDRAM circuits (e.g. DRAM A and DRAM B). However, since only one page can be open in a bank at any given time, only one of DRAM A or DRAM B may be in the active state at any given time. If the memory controller opens a page in DRAM A, then DRAM B may be placed in the precharge power down mode by de-asserting the CKE input to DRAM B. In another scenario, if the memory controller opens a page in DRAM B, then DRAM A may be placed in the precharge power down mode by de-asserting the CKE input to DRAM A. The power saving operation may, for example, comprise operating in precharge power down mode except when refresh is required. Of course, power-savings may also occur in other embodiments without such continuity.

In other optional embodiments, such power management or power saving operations or features may involve a power down operation (e.g. entry into a precharge power down mode, as opposed to an exit from precharge power down mode, etc.). As an option, such power saving operation may be initiated utilizing (e.g. in response to, etc.) a power management signal including, but not limited to, a clock enable signal (CKE), chip select signal (CS), in possible combination with other signals and optional commands. In other embodiments, use of a non-power management signal (e.g. control signal, etc.) is similarly contemplated for initiating the power management or power saving operation. Persons skilled in the art will recognize that any modification of the power behavior of DRAM circuits may be employed in the context of the present embodiment.

If power down occurs when there are no rows active in any bank, the DDR2 SDRAM may enter precharge power down mode. If power down occurs when there is a row active in any bank, the DDR2 SDRAM may enter one of the two active powerdown modes. The two active powerdown modes may include fast exit active powerdown mode or slow exit active powerdown mode. The selection of fast exit mode or slow exit mode may be determined by the configuration of a mode register. The maximum duration for either the active power down mode or the precharge power down mode may be limited by the refresh requirements of the DDR2 SDRAM and may further be equal to a maximum allowable tRFC value, "tRFC(MAX). DDR2 SDRAMs may require CKE to remain stable for a minimum time of tCKE(MIN). DDR2 SDRAMs may also require a minimum time of tXP(MIN) between exiting precharge power down mode or active power down mode and a subsequent non-read command. Furthermore, DDR2 SDRAMs may also require a minimum time of tXARD(MIN) between exiting active power down mode (e.g. fast exit) and a subsequent read command. Similarly, DDR2 SDRAMs may require a minimum time of tXARDS(MIN) between exiting active power down mode (e.g. slow exit) and a subsequent read command.

As an example, power management for a DDR2 SDRAM may require that the SDRAM remain in a power down mode for a minimum of three clock cycles [e.g. tCKE(MIN)=3 clocks]. Thus, the SDRAM may require a power down entry latency of three clock cycles.

Also as an example, a DDR2 SDRAM may also require a minimum of two clock cycles between exiting a power down mode and a subsequent command [e.g. tXP(MIN)=2 clock cycles; tXARD(MIN)=2 clock cycles]. Thus, the SDRAM may require a power down exit latency of two clock cycles.

Thus, by altering timing parameters (such as tRFC, tCKE, tXP, tXARD, and tXARDS) within aDRAMs, different power management behaviors may be emulated with great flexibility depending on how the aDRAM is presented to the memory controller. For example by emulating an aDRAM that has greater values of tRFC, tCKE, tXP, tXARD, and tXARDS (or, in general, subsets or super sets of these timing parameters) than a physical DRAM, it is possible to use power-management modes and schemes that could not be otherwise used.

Of course, for other DRAM or memory technologies, the powerdown entry latency and powerdown exit latency may be different, but this does not necessarily affect the operation of power management described herein.

Changing Other Abstracted Dram Timing Behavior

In the examples described above timing parameters such as tRFC, tCKE, tXP, tXARD, and tXARDS were adjusted to emulate different power management mechanisms in an aDRAM. Other timing parameters that may be adjusted by similar mechanisms to achieve various emulated behaviors in aDRAMs. Such timing parameters include, without limitation, the well-known timing parameters illustrated below in Table 2, which timing parameters may include any timing parameter for commands, or any timing parameter for precharge, or any timing parameter for refresh, or any timing parameter for reads, or any timing parameter for writes or other timing parameter associated with any memory circuit:

TABLE 2

| tAL | Posted CAS Additive Latency |
|-----|------------------------------|
| tFAW | 4-Bank Activate Period |
| tRAS | Active-to-Precharge Command Period |
| tRC | Active-to-Active (same bank) Period |
| tRCD | Active-to-Read or Write Delay |
| tRFC | Refresh-to-Active or Refresh-to-Refresh Period |
| tRP | Precharge Command Period |
| tRRD | Active Bank A to Active Bank B Command Period |
| tRTP | Internal Read-to-Precharge Period |
| tWR | Write Recovery Time |
| tWTR | Internal Write-to-Read Command Delay |

DRAMS in Parallel with Buffer Chip

Figure 3A:
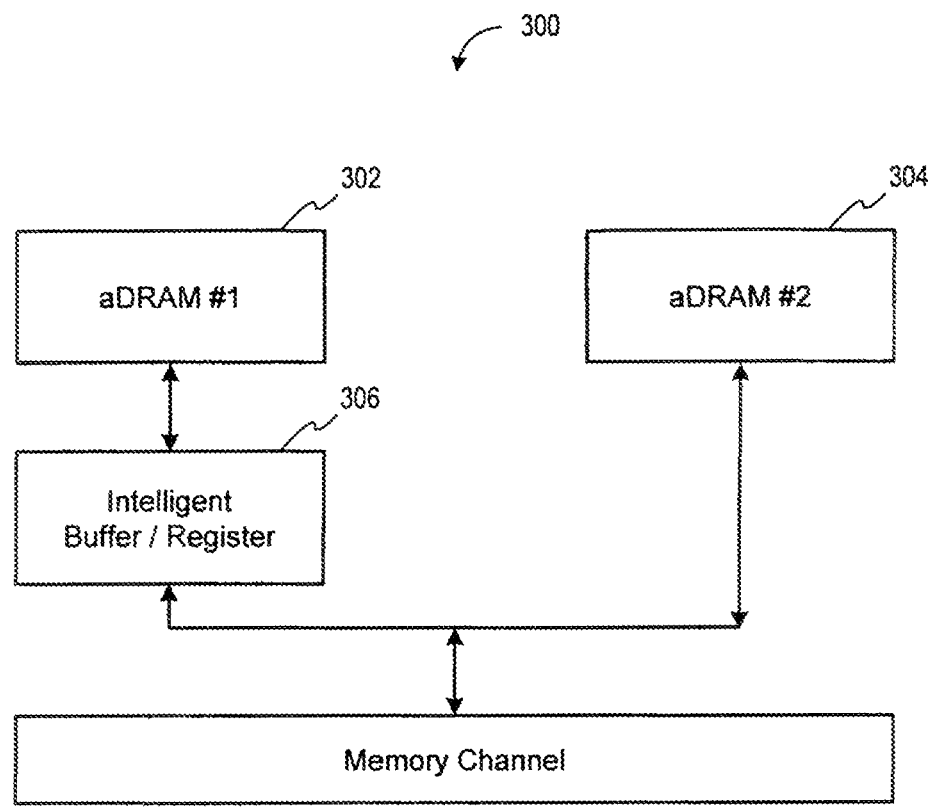
FIG. 3A: Depicts an embodiment showing two abstracted DRAMS with one DRAM situated behind an intelligent buffer/register, and a different abstracted DRAM connected directly to the memory channel.

FIG. 3A depicts a configuration 300 having an aDRAM 304 comprising a standard rank of DRAM in parallel with an aDRAM 302 behind an intelligent buffer chip 306, also known as an "intelligent buffer" 306. In such an embodiment aDRAM 302 is situated electrically behind the intelligent register 306 (which in turn is in communication with a memory channel buffer), while aDRAM 304 is connected directly to the memory channel buffer. In this configuration the characteristics presented by the aDRAM formed from the combination of intelligent buffer chip 306 and the memory behind intelligent register 306 may be made identical or different from the characteristics inherent in the physical memory. The intelligent buffer/register 306 may operate in any mode, or may operate to emulate any characteristic, or may consume power, or may introduce delay, or may power down any attached memory, all without affecting the operation of aDRAM 304.

Figure 3B:
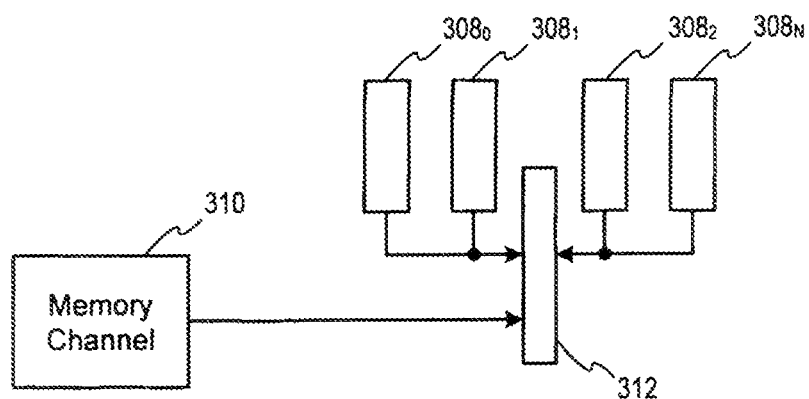
FIG. 3B: Depicts a memory channel in communication with an intelligent buffer, and plural DRAMs disposed symmetrically about the intelligent buffer, according to one embodiment.

In the embodiment as shown in FIG. 3B, the ranks of DRAM 3081-308N may be configured and managed by the intelligent buffer chip 312, either autonomously or under indication by or through the memory controller or memory channel 310. In certain applications, higher latencies can be tolerated by the compute subsystem, whereas, latency-sensitive applications would configure and use standard ranks using, for example, the signaling schemes described below. Moreover, in the configuration shown in FIG. 38, a wide range of memory organization schemes are possible.

Autonomous CKE Management

In FIG. 3B the intelligent buffer 312 can either process the CKE(s) from the memory controller before sending CKEs to the connected memories, or the intelligent buffer 312 may use CKEs from the host directly. Even still, the intelligent buffer 312 may be operable to autonomously generate CKEs to the connected memories. In some embodiments where the host does not implement CKE management, or does not implement CKE management having some desired characteristics, 312 may be operable to autonomously generate CKEs to the connected memories, thus providing CKE management in a system which, if not for the intelligent buffer 312 could not exhibit CKE management with the desired characteristics.

Improved Signal Integrity of Memory Channel

FIG. 3B depicts a memory channel 310 in communication with an intelligent buffer, and a plurality of DRAMs 3081-308N, disposed symmetrically about the intelligent buffer 312. As shown, 4 memory devices are available for storage, yet only a single load is presented to the memory channel, namely the load presented by the intelligent buffer to the memory channel 310. Such a reduction (comparatively) of the capacitive loading of the configuration in turn permits higher speeds, and/or higher noise margin or some combination thereto, which improves the signal integrity of the signals to/from the memory channel.

Dotting DQS

Figure 4A:
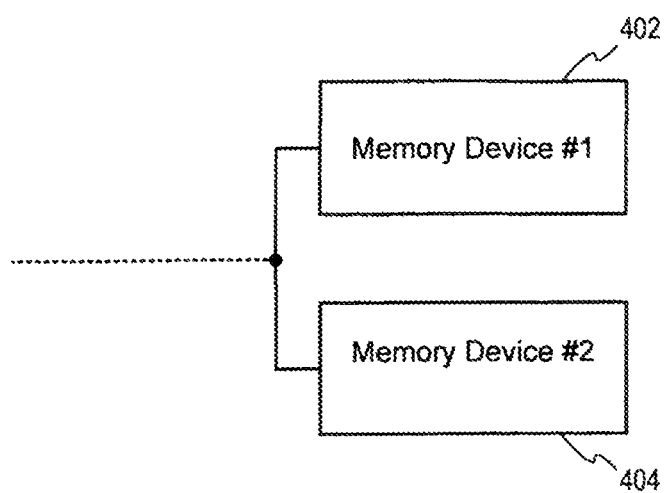
FIG. 4A: Depicts an embodiment showing the use of dotted DQs on a memory data bus.

FIG. 4A depicts physical DRAMS 402 and 404, whose data or DQ bus lines are electrically connected using the technique known as "dotted DQs." Thus DQ pins of multiple devices share the same bus. For example, each bit of the dotted bus (not shown) such as DQO from DRAM 402 is connected to DQO from DRAM 404 and similarly for DQ1, DQ2, and DQ3 (for a DRAM with x4 organization and 4 DQ bits). Novel use of dotted DQs bring to bear embodiments as are disclosed herein for reducing the number of signals in a stacked package, as well as for eliminating bus contention on a shared DQ bus, as well as for bringing to bear other improvements. Often a bidirectional buffer is needed for each separate DQ line. Sharing a DQ data bus reduces the number of separate DQ lines. Thus, in many important embodiments, the need for bidirectional buffers may be reduced through the use of multi-tapped or "dotted" DQ buses. Furthermore, in a stacked physical DRAM, the ability to dot DQs and share a data bus may greatly reduce the number of connections that should be carried through the stack.

Figure 4B:
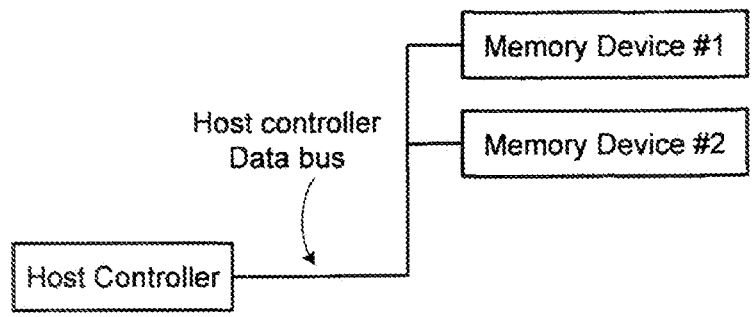
FIG. 4B: Depicts an embodiment showing the use of dotted DQs on a host-controller memory data bus.

The concept of dotting DQs may be applied, regardless if an interface buffer is employed or not. Interconnections involving a memory controller and a plurality of memory devices, without an interface buffer chip, are shown in FIG. 4B. In many modern memory systems such as SDRAM, DDR SDRAM, DDR2 SDRAM, DDR3 SDRAM, and Flash memory devices (not limited to these of course), multiple memory devices are often connected to the host controller on the same data bus as illustrated in FIG. 4B. Contention on the data bus is avoided by using rules that insert bus turnaround times, which are often lengthy.

Figure 4C:
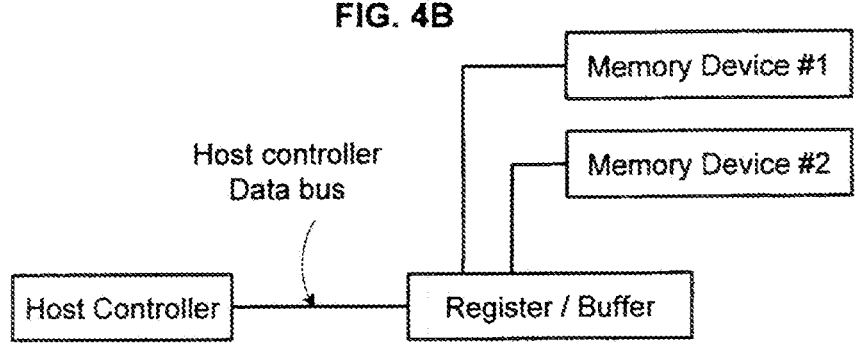
FIG. 4C: Depicts the use of separate DQs on a memory data bus behind an intelligent register/buffer.

An embodiment with interconnections involving a memory controller, and a plurality of memory devices to an interface buffer chip with point-to-point connections is shown in FIG. 4C.

Figure 4D:
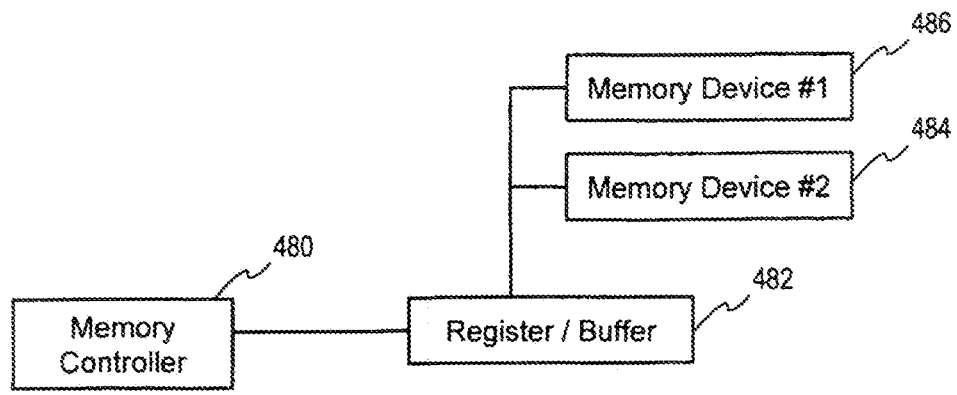
FIG. 4D: Depicts an embodiment showing the use of dotted DQs on a memory data bus behind an intelligent register/buffer.

FIG. 4D depicts an embodiment with interconnections involving a memory controller 480, an interface buffer chip 482, a plurality of memory devices 484, 486 connected to the interface buffer chip using the dotted DQ technique.

Figure 4E:
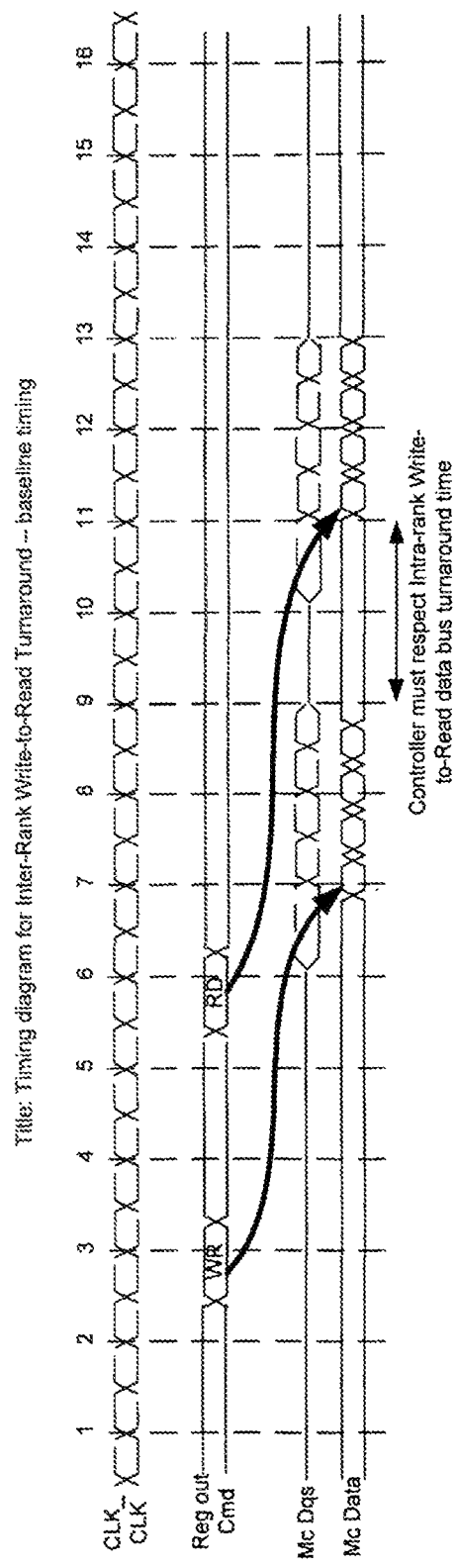
FIG. 4E: Depicts a timing diagram showing normal inter-rank write-to-read turnaround timing.

FIG. 4E depicts the data spacing on the shared data bus that must exist for a memory system between read and write accesses to different memory devices that shared the same data bus. The timing diagram illustrated in FIG. 4E is broadly applicable to memory systems constructed in the configuration of FIG. 4B as well as FIG. 4C.

Figure 4F:
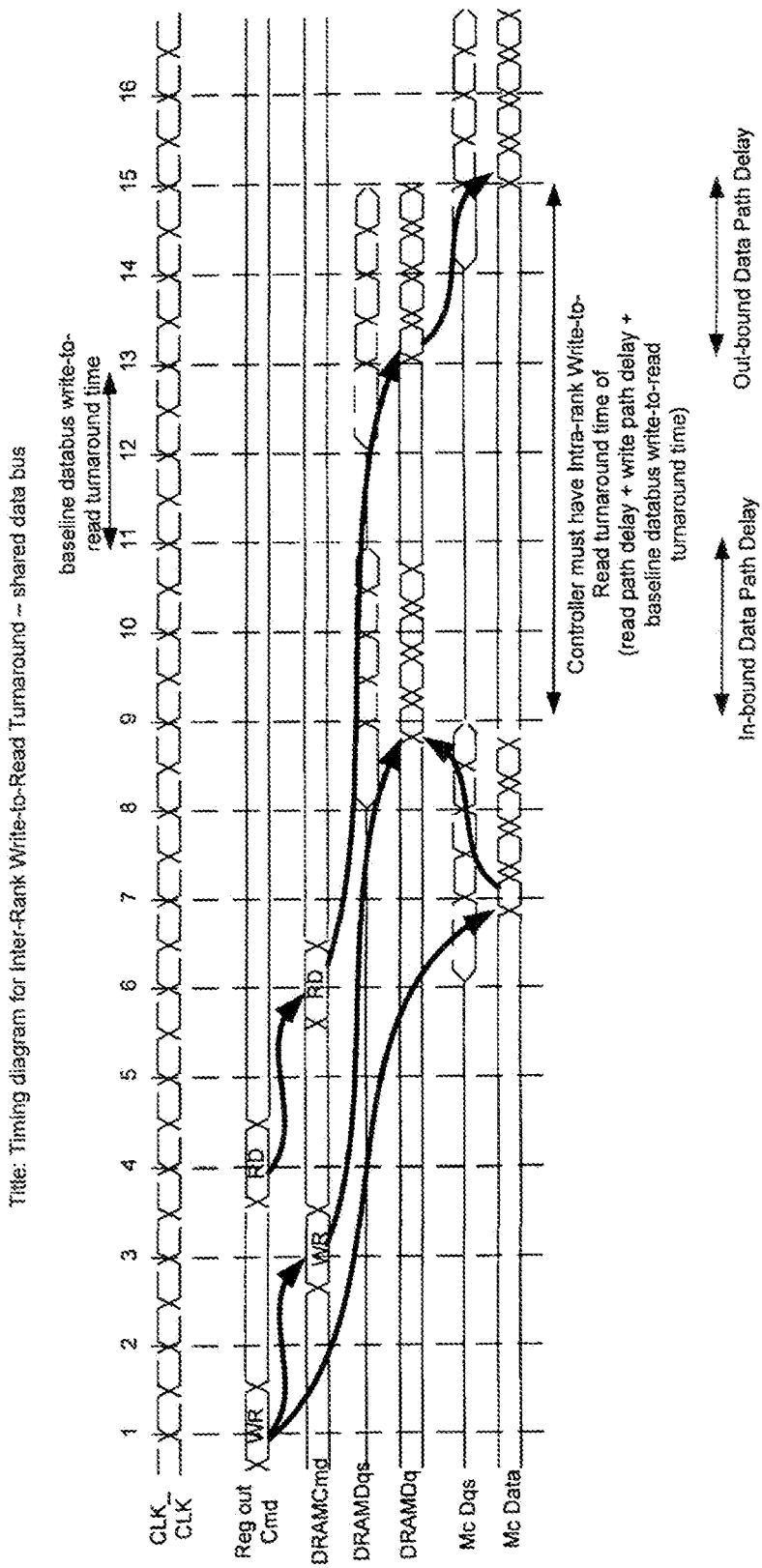
FIG. 4F: Depicts a timing diagram showing inter-rank write-to-read turnaround timing for a shared data bus behind an intelligent register/buffer.

FIG. 4F depicts the data spacing that should exist between data on the data bus between the interface circuit and the Host controller so that the required data spacing between the memory devices and the interface circuit is not violated.

An abstracted memory device, by presenting the timing parameters that differ from the timing parameters of a physical DRAM using, for example, the signaling schemes described below (in particular the bus turnaround parameters), as shown in example in FIGS. 4D and 4E, the dotted DQ bus configuration described earlier may be employed while satisfying any associated protocol requirements.

Similarly, by altering the timing parameters of the aDRAM according to the methods described above, the physical DRAM protocol requirements may be satisfied. Thus, by using the concept of aDRAMs and thus gaining the ability and flexibility to control different timing parameters, the vital bus turnaround time parameters can be advantageously controlled. Furthermore, as described herein, the technique known as dotting the DQ bus may be employed.

Control of Abstracted Dram Using Additional Signals

Figure 5:
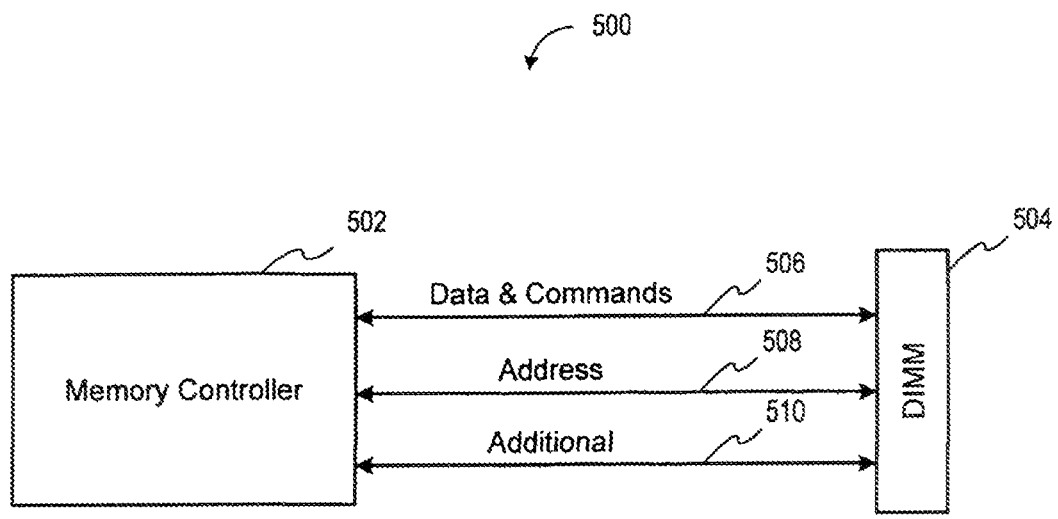
FIG. 5: Depicts an embodiment showing communication of signals in addition to data, commands, address, and control.

FIG. 5 depicts a memory controller 502 in communication with DIMM 504. DIMM 504 may include aDRAMs that are capable of emulating multiple behaviors, including different timing, power management and other behaviors described above. FIG. 5 shows both conventional data and command signals 506, 508 and additional signals 510 which are part of the following embodiments. The additional signals may be used to switch between different properties of the aDRAM. Strictly as an example, the additional signals may be of the form "switch to aggressive power management mode" or "switch to a longer timing parameter". In one embodiment, the additional signals might be implemented by extensions to existing protocols now present in industry-standard memory interface architectures, or additional signals might be implemented as actual physical signals not now present in current or prophetic industry-standard memory interface architectures. In the former case, extensions to existing protocols now present in industry-standard memory interface architectures might include new cycles, might use bits that are not used, might reuse bits in any protocol cycle in an overloading fashion (e.g. using the same bits or fields for different purposes at different times), or might use unique and unused combinations of bits or bit fields.

Extensions to Memory Standards for Handling Sub-Ranks

The concept of an aDRAM may be extended further to include the emulation of parts of an aDRAM, called planes. Conventional physical memories typically impose rules or limitations for handling memory access across the parts of the physical DRAM called ranks. These rules are necessary for intended operation of physical memories. However, the use of aDRAM and aDRAM planes, including memory subsystems created via embodiments of the present invention using intelligent buffer chips, permit such rules to be relaxed, suspended, overridden, augmented, or otherwise altered in order to create sub-ranks and/or planes. Moreover, dividing up the aDRAM into planes enables new rules to be created, which are different from the component physical DRAM rules, which in turn allows for better power, better performance, better reliability, availability and serviceability (known as RAS) features (e.g. sparing, mirroring between planes). In the specific case of the relaxation of timing parameters described above some embodiments are capable to better control CKE for power management than can be controlled for power management using techniques available in the conventional art.

If one thinks of an abstracted DRAM as an XY plane on which the bits are written and stored, then aDRAMs may be thought of as vertically stacked planes. In an aDRAM and an aDIMM built from aDRAMs, there may be different numbers of planes that may or may not correspond to a conventional rank, there may then be different rules for each plane (and this then helps to further increase the options and flexibility of power management for example). In fact characteristics of a plane might describe a partitioning, or might describe one or more portions of a memory, or might describe a sub-rank, or might describe an organization, or might describe virtually any other logical or group of logical characteristics There might even be a hierarchical arrangement of planes (planes within planes) affording a degree of control that is not present using the conventional structure of physical DRAMs and physical DIMMs using ranks.

Organization of Abstracted DIMMS

The above embodiments of the present invention have described an aDRAM. A conventional DIMM may then be viewed as being constructed from a number of aDRAMs. Using the concepts taught herein regarding aDRAMs, persons skilled in the art will recognize that a number of aDRAMS may be combined to form an abstracted DIMM or aDIMM. A physical DIMM may be viewed as being constructed from one of more aDIMMs. In other instances, an aDIMM may be constructed from one or more physical DIMMs. Furthermore, an aDIMM may be viewed as being constructed from (one or more) aDRAMs as well as being constructed from (one or more) planes. By viewing the memory subsystem as consisting of (one or more) aDIMMs, (one or more) aDRAMs, and (one or more) planes we increase the flexibility of managing and communicating with the physical DRAM circuits of a memory subsystem. These ideas of abstracting (DIMMs, DRAMs, and their subcomponents) are novel and extremely powerful concepts that greatly expand the control, use and performance of a memory subsystem.

Augmenting the host view of a DIMM to a view including one of more aDIMMs in this manner has a number of immediate and direct advantages, examples of which are described in the following embodiments.

Construction of Abstracted DIMMS

Figure 6A:
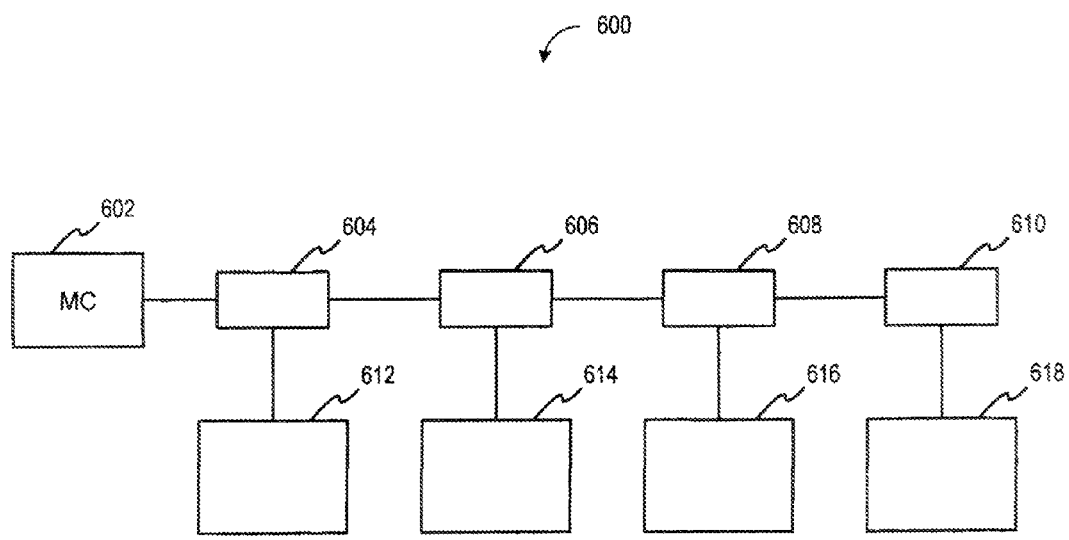
FIG. 6A: Depicts a number of DIMMs on a memory system bus.

FIG. 6A shows a memory subsystem 600 consisting of a memory controller 602 connected to a number of intelligent buffer chips 604, 606, 608, and 610. The intelligent buffer chips are connected to DIMMs 612, 614, 616, and 618.

Figure 6B:
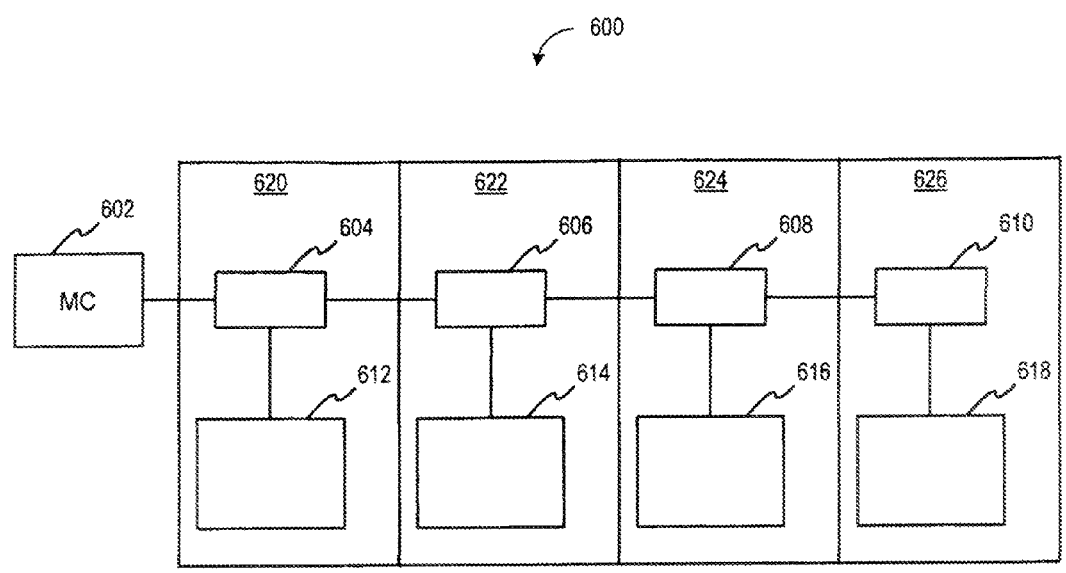
FIG. 6B: Depicts an embodiment showing a possible abstracted partitioning of a number of DIMMs behind intelligent register/buffer chips on a memory system bus.

FIG. 6B shows the memory subsystem 600 with partitions 620, 622, 624, and 626 such that the memory array can be viewed by the memory controller 602 as number of DIMMs 620, 622, 624, and 626.

Figure 6C:
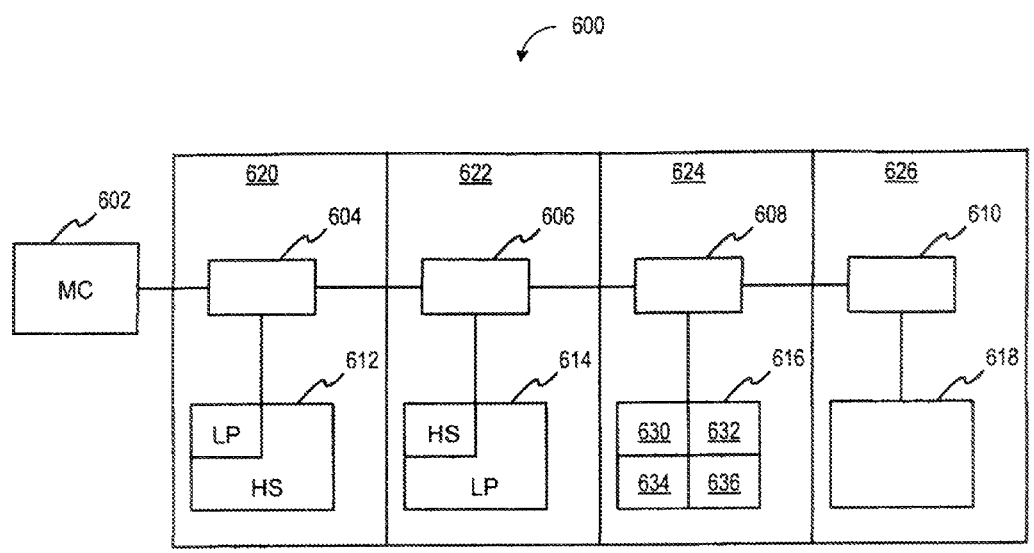
FIG. 6C: Depicts an embodiment showing a number of partitioned abstracted DIMMs behind intelligent register/buffer chips on a memory system bus.

FIG. 6C shows that each DIMM may be viewed as a conventional DIMM or as several aDIMMs. For example consider DIMM 626 that is drawn as a conventional physical DIMM. DIMM 626 consists of an intelligent buffer chip 610 and a collection of DRAM 618.

Now consider DIMM 624. DIMM 624 comprises an intelligent buffer chip 608 and a collection of DRAM circuits that have been divided into four aDIMMs, 630, 632, 634, and 636.

Continuing with the enumeration of possible embodiments using planes, the DIMM 614 has been divided into two aDIMMs, one of which is larger than the other. The larger region is designated to be low-power (LP). The smaller region is designated to be high-speed (HS). The LP region may be configured to be low-power by the MC, using techniques (such as CKE timing emulation) previously described to control aDRAM behavior (of the aDRAMs from which the aDIMM is made) or by virtue of the fact that this portion of the DIMM uses physical memory circuits that are by their nature low power (such as low-power DDR SDRAM, or "LPDDR, for example). The HS region may be configured to be high-speed by the memory controller, using techniques already described to change timing parameters. Alternatively regions may be configured by virtue of the fact that portions of the DIMM use physical memory circuits that are by their nature high speed (such as high-speed GDDR, for example). Note that because we have used aDRAM to construct an aDIMM, not all DRAM circuits need be the same physical technology. This fact illustrates the very powerful concept of aDRAMs and aDIMMs.

DIMM 612 has similar LP and HS aDIMMs but in different amounts as compared to vDMM 614. This may be configured by the memory controller or may be a result of the physical DIMM construction.

Figure 7A:
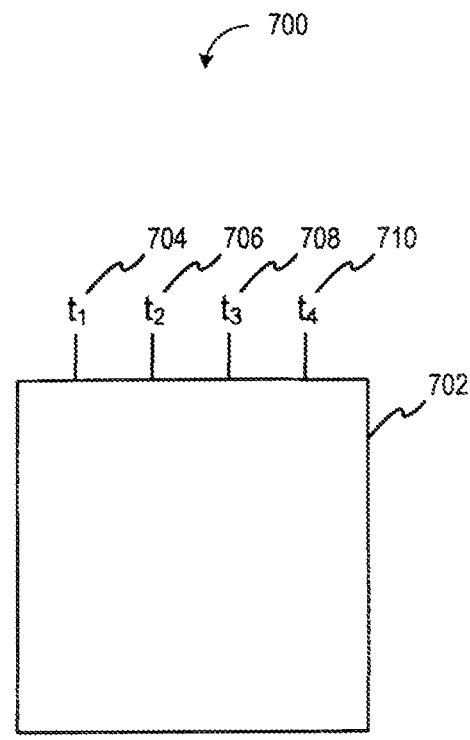
FIGS. 7A and 7B: Depict embodiments showing a number of partitioned abstracted memories using parameters for controlling the characteristics of the abstracted memories.
Figure 7B:
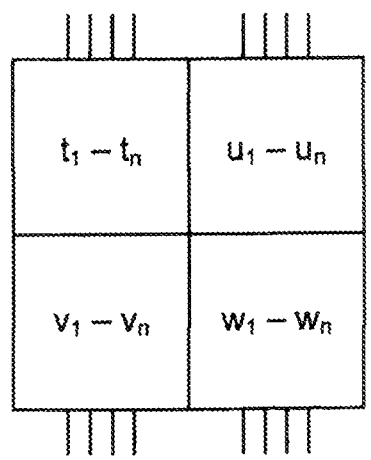

In a more generalized depiction, FIG. 7A shows a memory device 702 that includes use of parameters $t_1$, $t_2$, $t_3$, $t_4$. The memory device shown in FIG. 7B shows an abstracted memory device wherein the parameters $t_1$, $t_2$, $t_3$, . . . $t_n$ are applied in a region that coexists with other regions using parameters $u_1$-$u_n$, $v_1$-$v_n$, and $w_1$-$w_n$.

Embodiments of Abstracted DIMMS

One embodiment uses the emulation of an aDIMM to enable merging, possibly including burst merging, of streaming data from two aDIMMs to provide a continuous stream of data faster than might otherwise be achieved from a single conventional physical DIMM. Such burst-merging may allow much higher performance from the use of aDIMMs and aDRAMs than can otherwise be achieved due to, for example, limitations of the physical DRAM and physical DIMM on bus turnaround, burst length, burst-chop, and other burst data limitations. In so me embodiments involving at least two abstracted memories, the turnaround time characteristics can be configured for emulating a plurality of ranks in a seamless rank-to-rank read command scheme. In still other embodiments involving turnaround characteristics, data from a first abstracted DIMM memory might be merged (or concatenated) with the data of a second abstracted DIMM memory in order to form a continuous stream of data, even when two (or more) abstracted DIMM's are involved, and even when two (or more) physical memories are involved.

Another embodiment using the concept of an aDIMM can double or quadruple the number of ranks per DIMM and thus increases the flexibility to manage power consumption of the DIMM without increasing interface pin count. In order to implement control of an aDIMM, an addressing scheme may be constructed that is compatible with existing memory controller operation. Two alternative implementations of suitable addressing schemes are described below. The first scheme uses existing Row Address bits. The second scheme uses encoding of existing CS signals. Either scheme might be implemented, at least in part, by an intelligent buffer or an intelligent register, or a memory controller, or a memory channel, or any other device connected to memory interface 109.

Abstracted DIMM Address Decoding Option 1

Use A[15:14]

In the case that the burst-merging (described above) between DDR3 aDIMMs is used, Row, Address bits A[15] and A[14] may not be used by the memory controller— depending on the particular physical DDR3 SDRAM device used.

In this case Row Address A[15] may be employed as an abstracted CS signal that can be used to address multiple aDIMMs. Only one abstracted CS may be required if 2 Gb DDR3S DRAM devices are used. Alternatively A[15] and A[14] may be used as two abstracted CS signals if 1 Gb DDR3 SDRAM devices are used.

For example, if 2 Gb DDR3 SDRAM devices are used in an aDIMM, two aDIMMs can be placed behind a single physical CS, and A[15] can be used to distinguish whether the controller is attempting to address aDIMM #0 or aDIMM #1. Thus, to the memory controller, one physical DIMM (with one physical CS) appears to be composed of two aDIMMs or, alternatively, one DIMM with two abstracted ranks. In this way the use of aDIMMs could allow the memory controller to double (from 1 to 2) the number of ranks per physical DIMM.

Abstracted-DIMM Address Decoding Option 2

Using Encoded Chip Select Signals

An alternative to the use of Row Address bits to address aDIMMs is to encode one or more of the physical CS signals from the memory controller. This has the effect of increasing the number of CS signals. For example we can encode two CS signals, say CS[3:2], and use them as encoded CS signals that address one of four abstracted ranks on an aDIMM. The four abstracted ranks are addressed using the encoding CS[3:2]=00, CS[3:2]=01, CS[3:2]=10, and CS[3:2]=11. In this case two CS signals, CS[1:0], are retained for use as CS signals for the aDIMMs. Consider a scenario where CS[O] is asserted and commands issued by the memory controller are sent to one of the four abstracted ranks on aDIMM #0. The particular rank on aDIMM #0 may be specified by the encoding of CS[3:2]. Thus, for example, abstracted rank #0 corresponds to CS[3:2]=00. Similarly, when CS[1] is asserted, commands issued by the memory controller are sent to one of the four abstracted ranks on aDIMM #1.

Characteristics of Abstracted DIMMS

In a DIMM composed of two aDIMMs, abstracted rank N in aDIMM #0 may share the same data bus as abstracted rank N of aDIMM #1. Because of the sharing of the data bus, aDIMM-to-aDIMM bus turnaround times are created between accesses to a given rank number on different abstracted-DIMMs. In the case of an aDIMM seamless rank-to-rank turnaround times are possible regardless of the aDIMM number, as long as the accesses are made to different rank numbers. For example a read command to rank #0, aDIMM #0 may be followed immediately by a read command to rank #5 in abstracted DIMM #1 with no bus turnaround needed whatsoever.

Thus, the concept of an aDIMM has created great flexibility in the use of timing parameters. In this case, the use and flexibility of DIMM-to-DIMM and rank-to-rank bus turnaround times are enabled by aDIMMs.

It can be seen that the use of aDRAMs and aDIMMs now allows enormous flexibility in the addressing of a DIMM by a memory controller. Multiple benefits result from this approach including greater flexibility in power management, increased flexibility in the connection and interconnection of DRAMs in stacked devices and many other performance improvements and additional features are made possible.

Figure 8A:
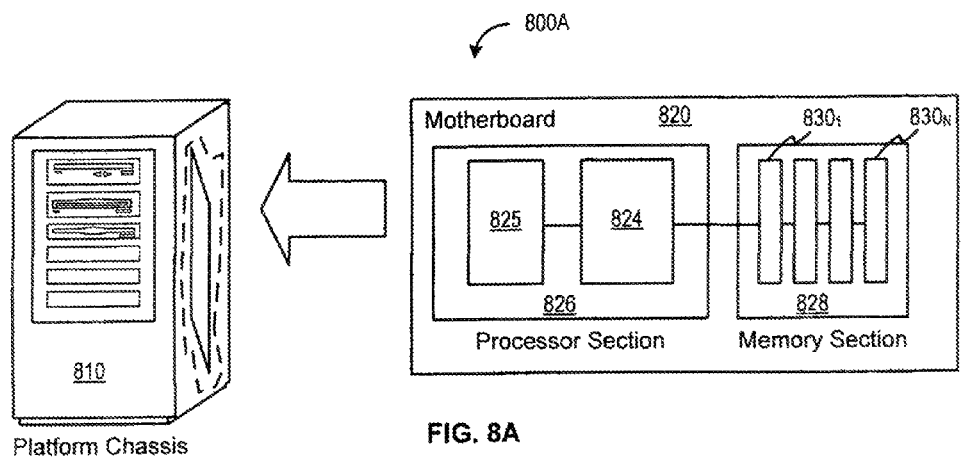

FIG. 8A illustrates a computer platform 800A that includes a platform chassis 810, and at least one processing element that consists of or contains one or more boards, including at least one motherboard 820. Of course the platform 800A as shown might comprise a single case and a single power supply and a single motherboard. However, it might also be implemented in other combinations where a single enclosure hosts a plurality of power supplies and a plurality of motherboards or blades.

The motherboard 820 in turn might be organized into several partitions, including one or more processor sections 826 consisting of one or more processors 825 and one or more memory controllers 824, and one or more memory sections 828. Of course, as is known in the art, the notion of any of the aforementioned sections is purely a logical partitioning, and the physical devices corresponding to any logical function or group of logical functions might be implemented fully within a single logical boundary, or one or more physical devices for implementing a particular logical function might span one or more logical partitions. For example, the function of the memory controller 824 might be implemented in one or more of the physical devices associated with the processor section 826, or it might be implemented in one or more of the physical devices associated with the memory section 828.

Figure 8B:
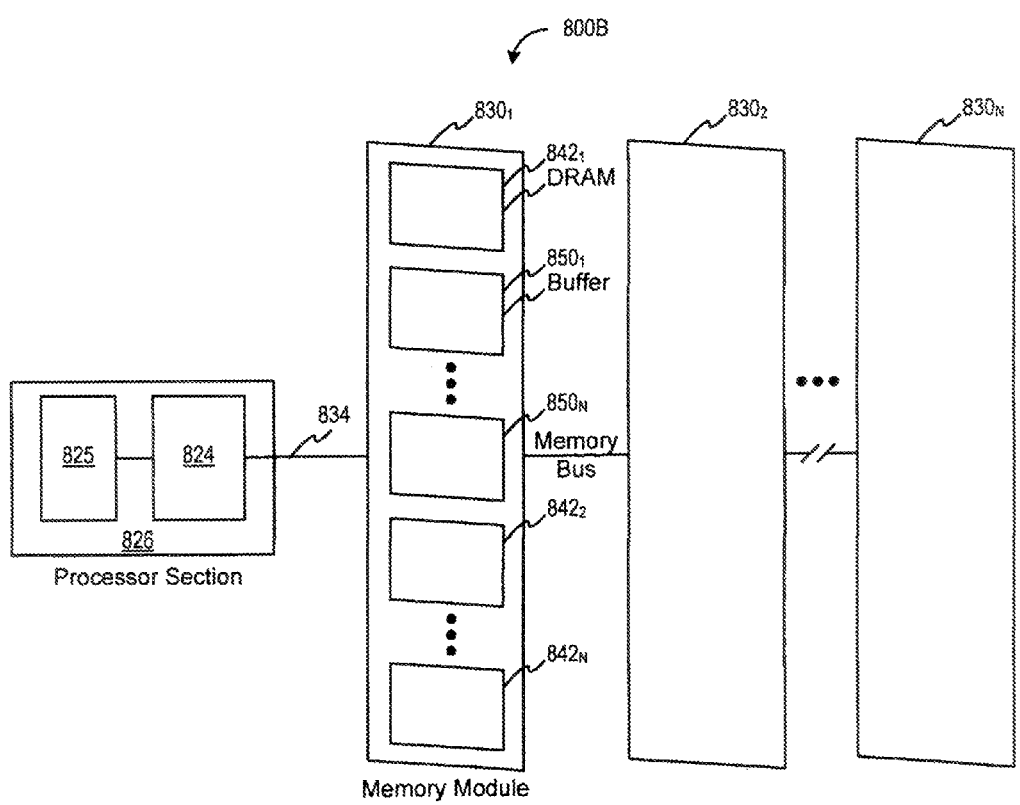

FIG. 8B illustrates one exemplary embodiment of a memory section, such as, for example, the memory section 828, in communication with a processor section 826. In particular, FIG. 8B depicts embodiments of the invention as is possible in the context of the various physical partitions on structure 820. As shown, one or more memory modules $830_1$-$830_N$ each contain one or more interface circuits $850_1$-$850_N$ and one or more DRAMs $842_1$-$842_N$ positioned on (or within) a memory module 8301.

It must be emphasized that although the memory is labeled variously in the figures (e.g. memory, memory components, DRAM, etc), the memory may take any form including, but not limited to, DRAM, synchronous DRAM (SDRAM), double data rate synchronous DRAM (DDR SDRAM, DDR2 SDRAM, DDR3 SDRAM, etc.), graphics double data rate synchronous DRAM (GDDR SDRAM, GDDR2 SDRAM, GDDR3 SDRAM, etc.), quad data rate DRAM (QDR DRAM), RAMBUS XDR DRAM (XDR DRAM), fast page mode DRAM (FPM DRAM), video DRAM (VORAM), extended data out DRAM (EDO DRAM), burst EDO RAM (BEDO DRAM), multibank DRAM (MORAM), synchronous graphics RAM (SGRAM), phase-change memory, flash memory, and/or any other type of volatile or non-volatile memory.

Many other partition boundaries are possible and contemplated, including positioning one or more interface circuits 850 between a processor section 826 and a memory module 830 (see FIG. 8C), or implementing the function of the one or more interface circuits 850 within the memory controller 824

(see FIG. 8D), or positioning one or more interface circuits 850 in a one-to-one relationship with the DRAMs 842$_1$-842$_N$ and a memory module 830 (see 8E), or implementing the one or more interface circuits 850 within a processor section 826 or even within a processor 825 (see FIG. 8F).

Furthermore, the system 100 illustrated in FIGS. 1A-1C is analogous to the computer platforms 800A-800F as Illustrated in FIGS. 8A-8F. The memory controller 480 illustrated in FIG. 4O is analogous to the memory controller 824 illustrated in FIGS. 8A-8F, the register I buffer 482 illustrated in FIG. 4D is analogous to the interface circuits 850 illustrated in FIGS. 8A-8F, and the memory devices 484 and 486 illustrated in FIG. 4O are analogous to the DRAMs 842 illustrated in FIGS. 8A-8F. Therefore, all discussions of FIGS. 1-4 apply with equal force to the systems illustrated in FIGS. 8A-8F.

While the foregoing is directed to embodiments of the present invention, other and further embodiments of the invention may be devised without departing from the basic scope thereof. Therefore, the scope of the present invention is determined by the claims that follow.

The invention claimed is:

1. A sub-system comprising:
a memory controller configured to be connected to both a first Dual In-line Memory Module (DIMM) and a second DIMM, wherein the memory controller is configured to present a first set of chip select signals to the first DIMM and a distinct second set of chip select signals to the second DIMM; and
a physical DIMM comprising an intelligent buffer and a collection of DRAM behind the intelligent buffer;
wherein the intelligent buffer is configured to
communicate with the memory controller,
operate a first subset of the collection of DRAM as a first abstracted DIMM (aDIMM) and a second subset of the collection of DRAM as a second aDIMM, and
present to the memory controller the first aDIMM as the first DIMM and the second aDIMM as the second DIMM;
wherein the physical DIMM and the intelligent buffer are configured to receive the first set of chip select signals and the second set of chip select signals from the memory controller; and
wherein the intelligent buffer is configured to provide the first set of chip select signals to the first subset of the collection of DRAM of the first aDIMM and to provide the second set of chip select signals to the second subset of the collection of DRAM of the second aDIMM.

2. The sub-system of claim 1, wherein the intelligent buffer is configured to present to the memory controller a first memory capacity for the first subset of the collection of DRAM of the first aDIMM, and a second memory capacity for the second subset of the collection of DRAM of the second aDIMM, and wherein a sum of the first and the second memory capacity is less than a total memory capacity of the collection of DRAM.

3. The sub-system in claim 1, wherein the intelligent buffer is configured to present to the memory controller a first set of characteristics associated with the first aDIMM and a distinct second set of characteristics associated with the second aDIMM.

4. The sub-system of claim 3, wherein the first and the second set of characteristics include sizes of memory address space, latency parameters, configuration characteristics, the power management modes, or the timing parameters.

5. The sub-system of claim 1, wherein the intelligent buffer is configured to emulate one or more of physical DRAM in the collection of DRAM as an abstracted DRAM (aDRAM).

6. The sub-system of claim 5, wherein the aDRAM uses a different protocol as compared with the memory controller, and wherein the intelligent buffer is configured to perform protocol translation between the aDRAM and the memory controller.

7. The sub-system of claim 5, wherein the intelligent buffer is configured to provide additional signals not presented by the memory controller to the aDRAM in order to control characteristics of the aDRAM.

8. The sub-system of claim 5, wherein the intelligent buffer is configured to provide the first and the second set of chip select signals as a highest bit in row address bits associated with the collection of DRAM.

9. The sub-system in claim 5, wherein the intelligent buffer is configured to present to the memory controller a DRAM type associated with the aDRAM, wherein the DRAM type is different from a DRAM type associated with the one or more physical DRAM.

10. The sub-system in claim 9, wherein the DRAM type associated with the aDRAM includes a DDR2 memory, a DDR3 memory, a GDDR5 memory, a LPDDR2 memory, a GDDR3 memory, a NOR flash memory, or a NAND flash memory.

11. The sub-system of claim 5, wherein the intelligent buffer is configured to provide a clock-enable (CKE) signal to the aDRAM in order to control timing parameters of the aDRAM.

12. The sub-system of claim 11, wherein the timing parameters include at least one of a tRP timing, a tRCD timing, a TWL timing, a tRFC timing, a tCKE timing, a tXP timing, a tXARD timing, a TXRDS timing, a tAL timing, a tFAW timing, a tRAS timing, a tRC timing, a tRRD timing, a tRTP timing, a tWR timing, or a tWTR timing.

13. The sub-system of claim 11, wherein the first subset of the collection of DRAM of the first aDIMM include the aDRAM, and wherein the intelligent buffer is configured to provide the CKE signal and at least one of the first set of chip select signals to the aDRAM in order to control power management modes of the aDRAM.

14. The sub-system of claim 13, wherein the intelligent buffer is configured to present to the memory controller a first set of characteristics associated with the aDRAM at an earlier segment of time, and to present to the memory controller a distinct second set of characteristics associated with the aDRAM at a later segment of time.

15. The sub-system of claim 14, wherein the first and the second set of characteristics include sizes of memory address space, latency parameters, configuration characteristics, the power management modes, or the timing parameters.

16. A memory module comprising:
a physical DIMM comprising an intelligent buffer and a collection of DRAM behind the intelligent buffer;
wherein the intelligent buffer is configured to
communicate with a memory controller,
operate a first subset of the collection of DRAM as a first abstracted DIMM (aDIMM) and a second subset of the collection of DRAM as a second aDIMM, and
present to the memory controller the first aDIMM as a first DIMM and the second aDIMM as a second DIMM;
wherein the physical DIMM and the intelligent buffer are configured to receive the first set of chip select signals and the second set of chip select signals from the memory controller; and
wherein the intelligent buffer is configured to provide the first set of chip select signals to the first subset of the collection of DRAM of the first aDIMM and to provide the second set of chip select signals to the second subset of the collection of DRAM of the second aDIMM.

17. The memory module of claim 16, wherein the intelligent buffer is configured to emulate one or more of physical DRAM in the collection of DRAM as an abstracted DRAM (aDRAM).

18. The memory module of claim 17, wherein the aDRAM uses a different protocol as compared with the memory controller, and wherein the intelligent buffer is configured to perform protocol translation between the aDRAM and the memory controller.

19. The memory module of claim 17, wherein the intelligent buffer is configured to provide a clock-enable (CKE) signal to the aDRAM in order to control timing parameters of the aDRAM, and wherein the timing parameters include at least one of a tRP timing, a tRCD timing, a TWL timing, a tRFC timing, a tCKE timing, a tXP timing, a tXARD timing, a TXRDS timing, a tAL timing, a tFAW timing, a tRAS timing, a tRC timing, a tRRD timing, a tRTP timing, a tWR timing, or a tWTR timing.

20. The memory module of claim 19, wherein the DRAM of the first aDIMM include the aDRAM, and wherein the intelligent buffer is configured to provide the CKE signal and at least one of the first set of chip select signals to the aDRAM in order to control power management modes of the aDRAM.

\* \* \* \* \*